US012061447B2

United States Patent
Gottschalk et al.

(10) Patent No.: US 12,061,447 B2
(45) Date of Patent: Aug. 13, 2024

(54) SYSTEMS AND METHODS FOR AUTOMATIC INTERACTION WITH A FLEXIBLE NUMBER OF DEVICES

(71) Applicant: Johnson Controls Technology Company, Auburn Hills, MI (US)

(72) Inventors: Donald A. Gottschalk, Racine, WI (US); Gregory B. Cebasek, New Berlin, WI (US); Jeffrey D. Taylor, Milwaukee, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 712 days.

(21) Appl. No.: 17/131,441

(22) Filed: Dec. 22, 2020

(65) Prior Publication Data
US 2021/0109489 A1    Apr. 15, 2021

Related U.S. Application Data

(63) Continuation-in-part of application No. 16/661,046, filed on Oct. 23, 2019, now abandoned, and a continuation-in-part of application No. 16/733,135, filed on Jan. 2, 2020, now Pat. No. 11,119,459, which is a continuation of application No. 15/592,031, filed
(Continued)

(51) Int. Cl.
*G05B 15/02*  (2006.01)
*H04L 12/28*  (2006.01)
(52) U.S. Cl.
CPC .......... *G05B 15/02* (2013.01); *H04L 12/2809* (2013.01); *G05B 2219/2642* (2013.01)

(58) Field of Classification Search
None
See application file for complete search history.

(56) References Cited

U.S. PATENT DOCUMENTS 6,167,316 A * 12/2000 Gloudeman ............ G06F 9/465
                                                                    700/79
7,164,972 B2   1/2007 Imhof et al.
(Continued)

OTHER PUBLICATIONS

Jarvinen et al., "Integration Platform for Home and Building Automation Systems", 5th IEEE Workshop on Personalized Networks, 2011 (5 pages).
(Continued)

*Primary Examiner* — Van H Nguyen
(74) *Attorney, Agent, or Firm* — Foley & Lardner LLP

(57) ABSTRACT

Systems and methods for automatically interacting with a flexible number of devices are provided. The system includes a plurality of devices, a configuration tool, and a controller. The plurality of devices are configured to measure or generate a plurality of points in a building automation system. The configuration tool is configured to generate a control program. The controller is configured to identify a primary list of N devices, where N is an integer. The controller is configured to automatically generate a plurality of secondary lists of points based on the primary list of N devices. The controller is configured to provide the plurality of secondary lists of points as inputs to a control logic configured to use the plurality of secondary lists of points to generate one or more control signals to control the N devices.

17 Claims, 26 Drawing Sheets

Related U.S. Application Data on May 10, 2017, now Pat. No. 10,558,183, which is a continuation of application No. 14/251,414, filed on Apr. 11, 2014, now Pat. No. 9,703,276.

(60) Provisional application No. 62/785,988, filed on Dec. 28, 2018.

(56) References Cited

U.S. PATENT DOCUMENTS

| | | | |
|---|---|---|---|
| 7,502,323 | B2 | 3/2009 | Brun et al. |
| 7,634,555 | B1 | 12/2009 | Wainscott et al. |
| 7,904,186 | B2 | 3/2011 | Mairs et al. |
| 8,190,728 | B1 | 5/2012 | Wainscott et al. |
| 8,270,767 | B2 | 9/2012 | Park |
| 8,325,637 | B2 | 12/2012 | Salsbury et al. |
| 8,863,018 | B2 | 10/2014 | Taylor et al. |
| 9,411,327 | B2 | 8/2016 | Park |
| 9,703,276 | B2 | 7/2017 | Piaskowski et al. |
| 10,158,750 | B2 * | 12/2018 | Dagit, III ......... H04N 21/42224 |
| 10,558,183 | B2 | 2/2020 | Piaskowski et al. |
| 10,613,504 | B2 * | 4/2020 | Chowdhury ....... G05B 19/0428 |
| 10,848,565 | B1 * | 11/2020 | Hobgood ................ H04W 4/00 |
| 10,976,068 | B2 | 4/2021 | Hallendy et al. |
| 11,038,706 | B2 * | 6/2021 | Malakuti ................... G06F 8/35 |
| 11,307,543 | B2 * | 4/2022 | Sridharan .............. G05B 15/02 |
| 2006/0058923 | A1 | 3/2006 | Kruk et al. |
| 2007/0055390 | A1 | 3/2007 | Simon et al. |
| 2007/0232288 | A1 | 10/2007 | McFarland et al. |
| 2008/0209342 | A1 | 8/2008 | Taylor et al. |
| 2008/0222565 | A1 | 9/2008 | Taylor et al. |
| 2011/0071685 | A1 * | 3/2011 | Huneycutt ............. G05B 15/02 700/275 |
| 2015/0293508 | A1 * | 10/2015 | Piaskowski ......... H04L 12/2809 700/275 |
| 2017/0300193 | A1 | 10/2017 | Ray et al. |
| 2018/0113573 | A1 | 4/2018 | Kulus et al. |

OTHER PUBLICATIONS

Schmitz et al., "Automation of Automation—Definition, Components and Challenges," ETFA'09: Proceedings of the 14th IEEE international conference on Emerging technologies & factory automation, Sep. 2009 (pp. 9-15).

Amaral et al., Towards a robust solution in Building Automation Systems: supporting rapid prototyping and analysis, 2012 Eighth International Conference on the Quality of Information and Communications Technology, IEEE, 2012, pp. 261-264.

Oezluek et al., "Optimal Device Placement Planning for Wireless Building Automation Systems," IEEE, 2013, 4 pages.

* cited by examiner

SYSTEMS AND METHODS FOR AUTOMATIC INTERACTION WITH A FLEXIBLE NUMBER OF DEVICES

CROSS-REFERENCE TO RELATED APPLICATIONS

This application is a Continuation-In-Part of U.S. application Ser. No. 16/661,046, filed Oct. 23, 2019, which claims the benefit of and priority to U.S. Provisional Application No. 62/785,988, filed Dec. 28, 2018. This application is also a Continuation-In-Part of U.S. application Ser. No. 16/733,135, filed Jan. 2, 2020, which is a Continuation of U.S. application Ser. No. 15/592,031, filed May 10, 2017, issued as U.S. Pat. No. 10,558,183, which is a Continuation of U.S. application Ser. No. 14/251,414, filed Apr. 11, 2014, issued as U.S. Pat. No. 9,703,276, all of which are incorporated herein by reference in their entirety.

BACKGROUND

The present disclosure relates generally to a building automation system (BAS). The present disclosure relates more particularly to automatic interaction with a flexible number of devices in a BAS.

A BAS is, in general, a system of devices configured to control, monitor, and manage equipment in or around a building or building area. A BAS can include, for example, a HVAC system, a security system, a lighting system, a fire alerting system, any other system that is capable of managing building functions or devices, or any combination thereof. A BAS can include various types of building equipment (e.g., chillers, fans, valves, dampers, etc.) that operate to control conditions within a building space.

A controller may control different numbers of equipment when being used in different building spaces. For example, an air handling unit (AHU) controller in a first building space may control 5 variable air volume (VAV) units while another AHU controller in a second building space may control 12 VAVs. Thus, applications running on controllers that control a variable number of equipment may have to be customized to handle the variable number of equipment that can be present on each site. Such customization, however, can be both time consuming and costly, and in many cases, may inhibit the application of optimizations that would benefit the end customers.

SUMMARY

One implementation of the present disclosure is a system for automatically interacting with a flexible number of devices. The system can include a plurality of devices configured to measure or generate a plurality of points in a building automation system. Each point of the plurality of points is associated with a model class. The system can include a configuration tool configured to generate a control program. The system can include a controller comprising a processor and memory. The memory stores the control program which, when executed by the processor, can cause the processor to identify a primary list of N devices among the plurality of devices, automatically generate a plurality of secondary lists of points based on the primary list of N devices, and provide the plurality of secondary lists of points as inputs to a control logic configured to use the plurality of secondary lists of points to generate one or more control signals to control the N devices. N is an integer. Each secondary list includes N points, each of the N points in each secondary list is associated with a respective device of the N devices in the primary list, all N points within a same secondary list belong to a same model class, and points in different secondary lists belong to different model classes.

In some embodiments, the memory stores the control program, which when executed by the processor, further causes the processor to identify a plurality of points on each device, and select a subset of points of the plurality of points to generate the secondary lists based on a determination that the subset of points are inputs to the control logic.

In some embodiments, the memory stores the control program, which when executed by the processor, further causes the processor to identify the plurality of points on each device by searching a database using the each device as index. The database includes relationships between devices and points.

In some embodiments, the model class includes a type of temperatures, a type of pressures, a type of flow rates, a type of positions, or a type of resource consumptions.

In some embodiments, all N points in a secondary list are of a same data type.

In some embodiments, the data type includes an analog data type, a Boolean data type, or a float data type.

In some embodiments, the N devices relate to each other based on a predetermined criteria.

In some embodiments, the memory stores the control program, which when executed by the processor, further causes the processor to identify a second primary list of M devices among the plurality of devices. M is an integer, and M does not equal to N. The memory stores the control program, which when executed by the processor, further causes the processor to automatically generate a second plurality of secondary lists of points based on the second primary list of M devices. Each of the second plurality of secondary lists includes M points, each of the M points is associated with a respective device of the M devices, all M points within a same second secondary list belong to a same model class, and points in different second secondary lists belong to different model classes. The memory stores the control program, which when executed by the processor, further causes the processor to provide the second plurality of secondary lists of points as inputs to the control logic configured to use the second plurality of secondary lists of points to generate one or more control signals to control the M devices.

Another implementation of the present disclosure is a device for automatically interacting with a flexible number of devices. The device includes a processor and a memory coupled to the processor. The memory stores computer-executable instructions, which when executed by the processor, cause the processor to identify a primary list of N devices configured to measure or generate a plurality of points. N is an integer, and each point of the plurality of points is associated with a model class. The memory stores computer-executable instructions, which when executed by the processor, cause the processor to automatically generate a plurality of secondary lists of points based on the primary list of N devices. Each secondary list includes N points, each of the N points in each secondary list is associated with a respective device of the N devices in the primary list, all N points within a same secondary list belong to a same model class, and points in different secondary lists belong to different model classes. The memory stores computer-executable instructions, which when executed by the processor, cause the processor to provide the plurality of secondary lists of points as inputs to a control logic configured to use the plurality of secondary lists of points to generate one or more control signals to control the N devices.

Another implementation of the present disclosure is a method for automatically interacting with a flexible number of devices. The method includes receiving, by a computing device comprising a processor and memory, a command to connect an equipment object and a point object. The equipment object represents a list of N devices configured to measure or generate a plurality of points in a building automation system, N is an integer, and each point of the plurality of points is associated with a model class. The method includes presenting a user interface configured to accept selections of a plurality of points on the devices. The method includes generating one or more lists of points responsive to receiving the selections of the plurality of points on the devices. Each list of points includes N points, each of the N points in each list of points is associated with a respective device in the list of N devices, all N points within a same list of points belong to a same model class, and points in different lists of points belong to different model classes.

In some embodiments, the method includes providing the one or more lists of points as inputs to a control logic configured to use the one or more lists of points to generate a control signal to control the N devices.

In some embodiments, the user interface is configured to allow searching for the list of N devices.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of systems, methods, and apparatuses for automatic interaction with a flexible number of devices. Before turning to the more detailed descriptions and figures, which illustrate the exemplary embodiments in detail, it should be understood that the application is not limited to the details or methodology set forth in the descriptions or illustrated in the figures. It should also be understood that the terminology is for the purpose of description only and should not be regarded as limiting.

Building Automation System and HVAC System

Figure 1:
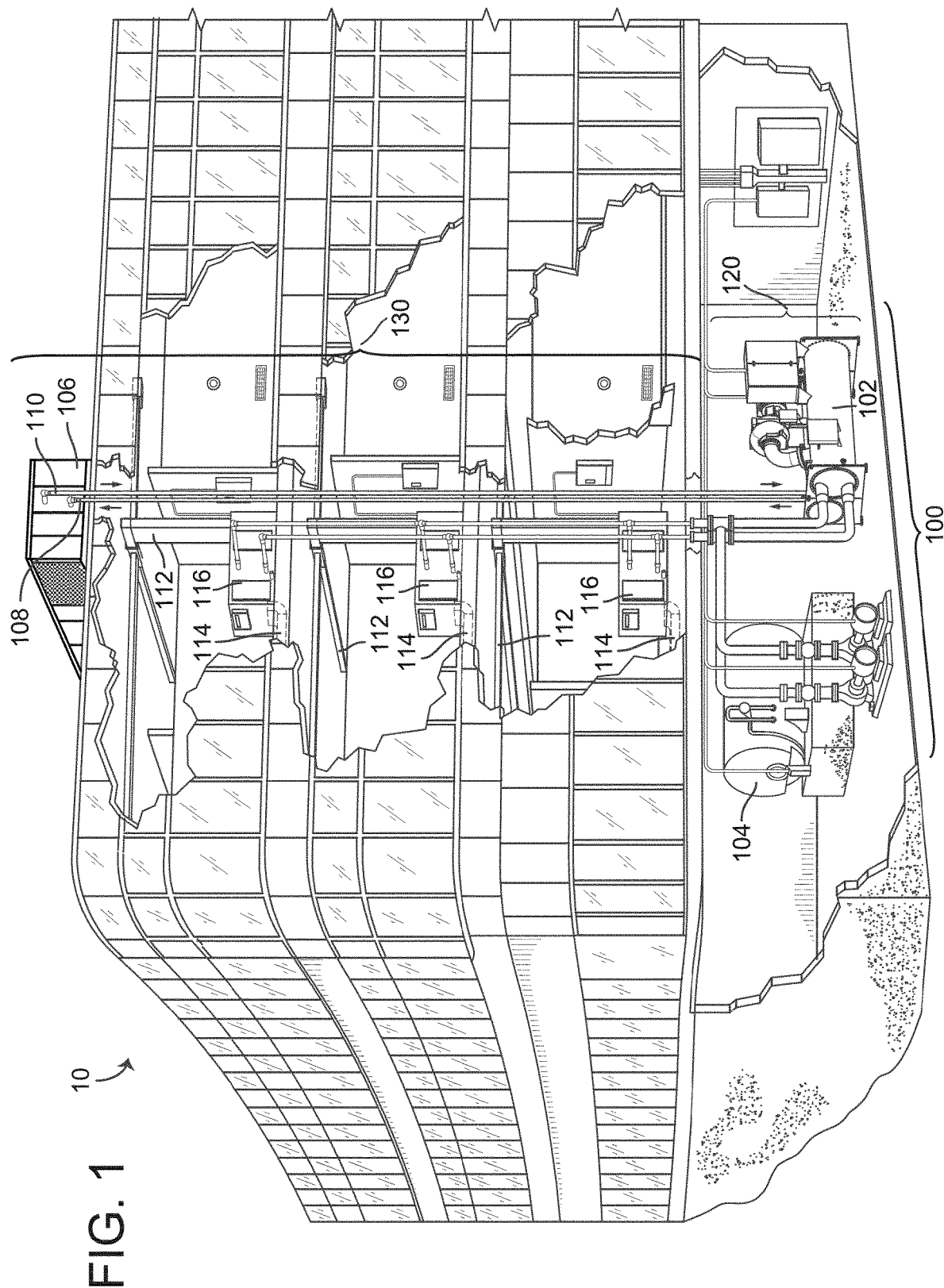
FIG. 1 is a drawing of a building equipped with a BAS which includes a HVAC system, according to an exemplary embodiment.

Referring now to FIGS. 1-4, an exemplary building automation system (BAS) and HVAC system in which the systems and methods of the present invention may be implemented are shown, according to an exemplary embodiment. Referring particularly to FIG. 1, a perspective view of a building 10 is shown. Building 10 is served by a BAS. A BAS is, in general, a system of devices configured to control, monitor, and manage equipment in or around a building or building area. A BAS can include, for example, a HVAC system, a security system, a lighting system, a fire alerting system, any other system that is capable of managing building functions or devices, or any combination thereof.

The BAS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
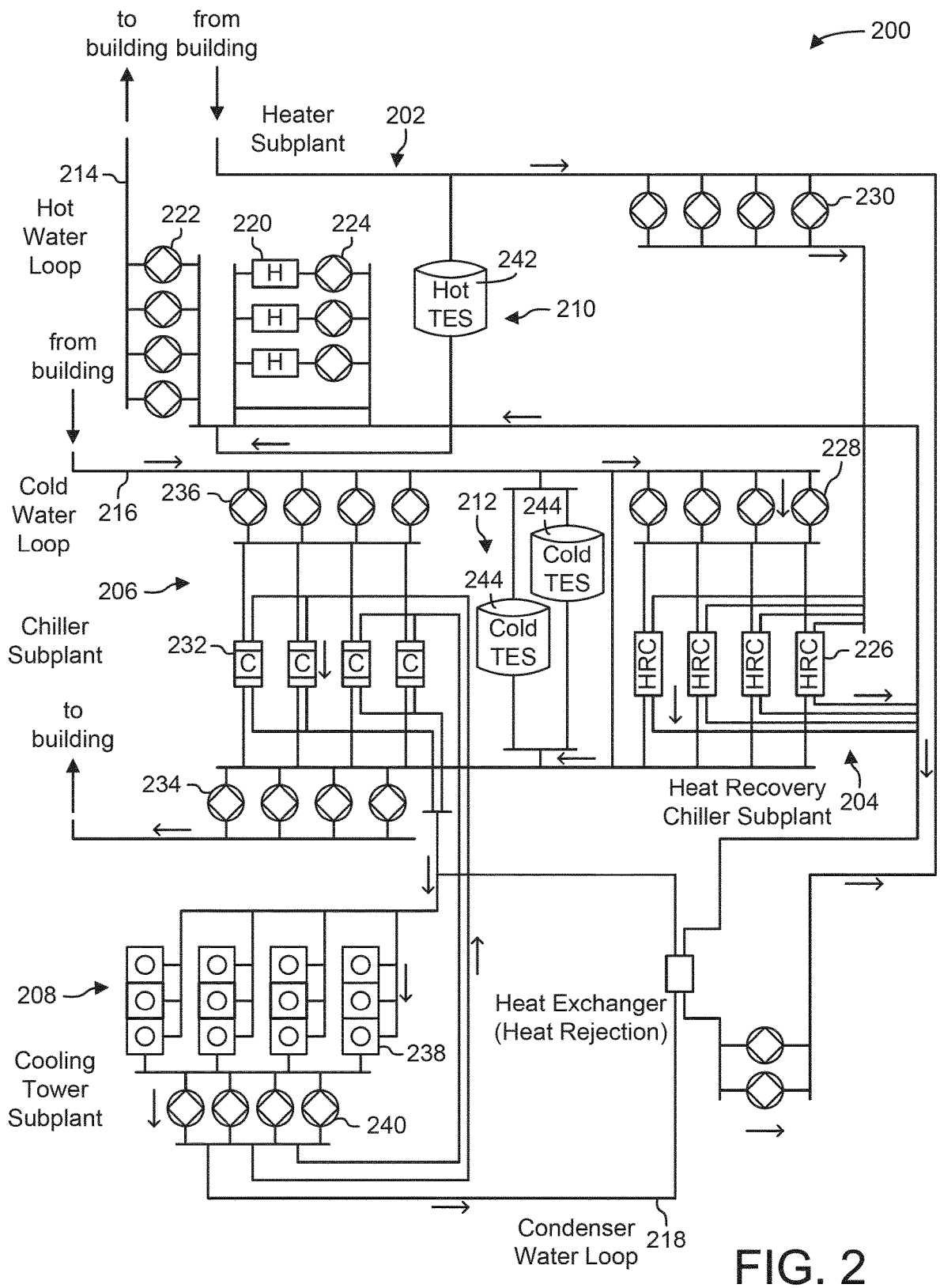
FIG. 2 is a block diagram of a waterside system which can be used to serve the building of FIG. 1, according to an exemplary embodiment.

Referring now to FIG. 2, a block diagram of a waterside system 200 is shown, according to an exemplary embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
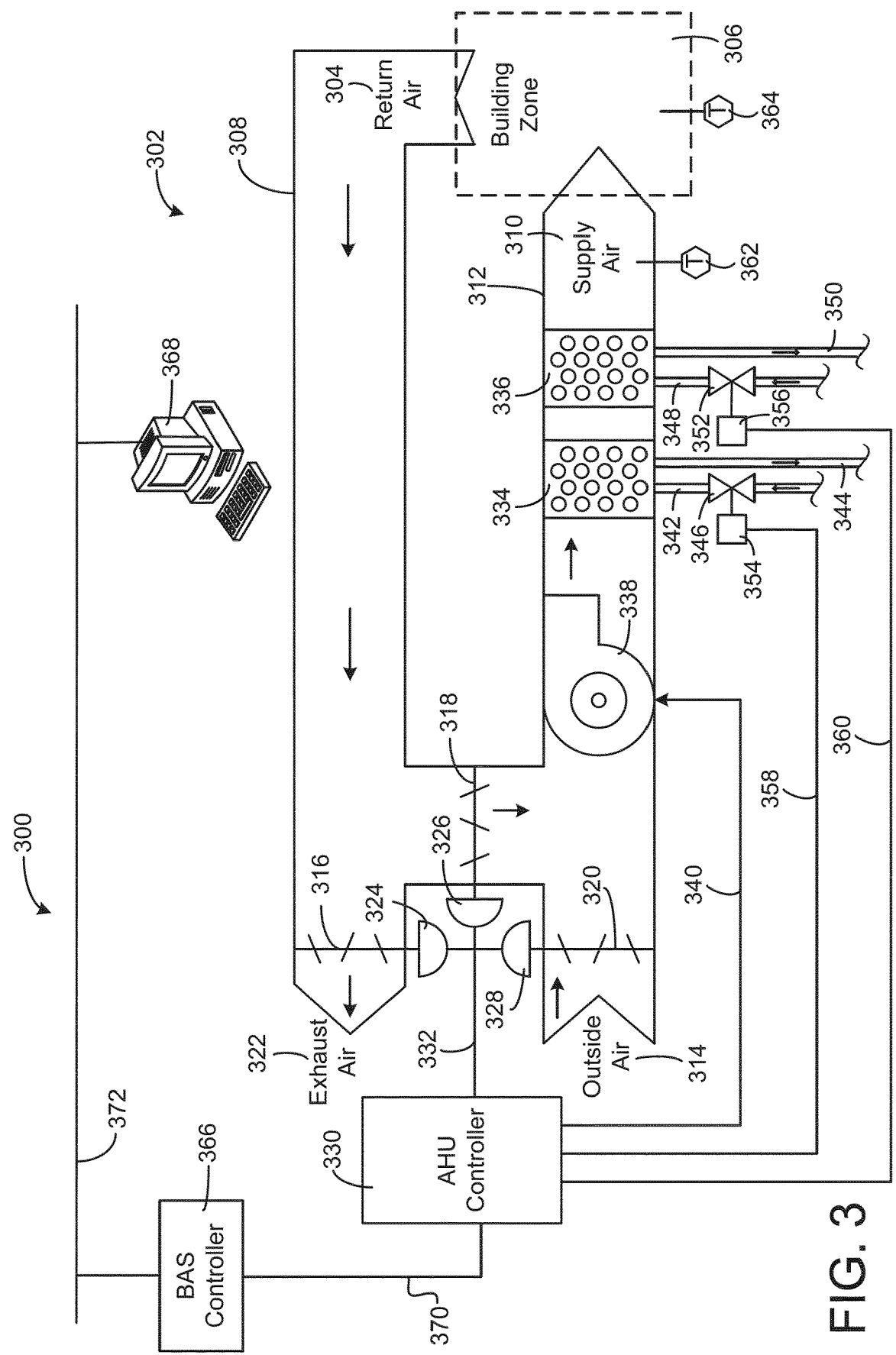
FIG. 3 is a block diagram of an airside system which can be used to serve the building of FIG. 1, according to an exemplary embodiment.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BAS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BAS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building automation system (BAS) controller 366 and a client device 368. BAS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BAS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BAS controller 366 may be separate (as shown in FIG. 3) or integrated. In an integrated implementation, AHU controller 330 may be a software module configured for execution by a processor of BAS controller 366.

In some embodiments, AHU controller 330 receives information from BAS controller 366 (e.g., commands, setpoints, operating boundaries, etc.) and provides information to BAS controller 366 (e.g., temperature measurements, valve or actuator positions, operating statuses, diagnostics, etc.). For example, AHU controller 330 may provide BAS controller 366 with temperature measurements from temperature sensors 362-364, equipment on/off states, equipment operating capacities, and/or any other information that can be used by BAS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BAS controller 366 and/or AHU controller 330 via communications link 372.

Figure 4:
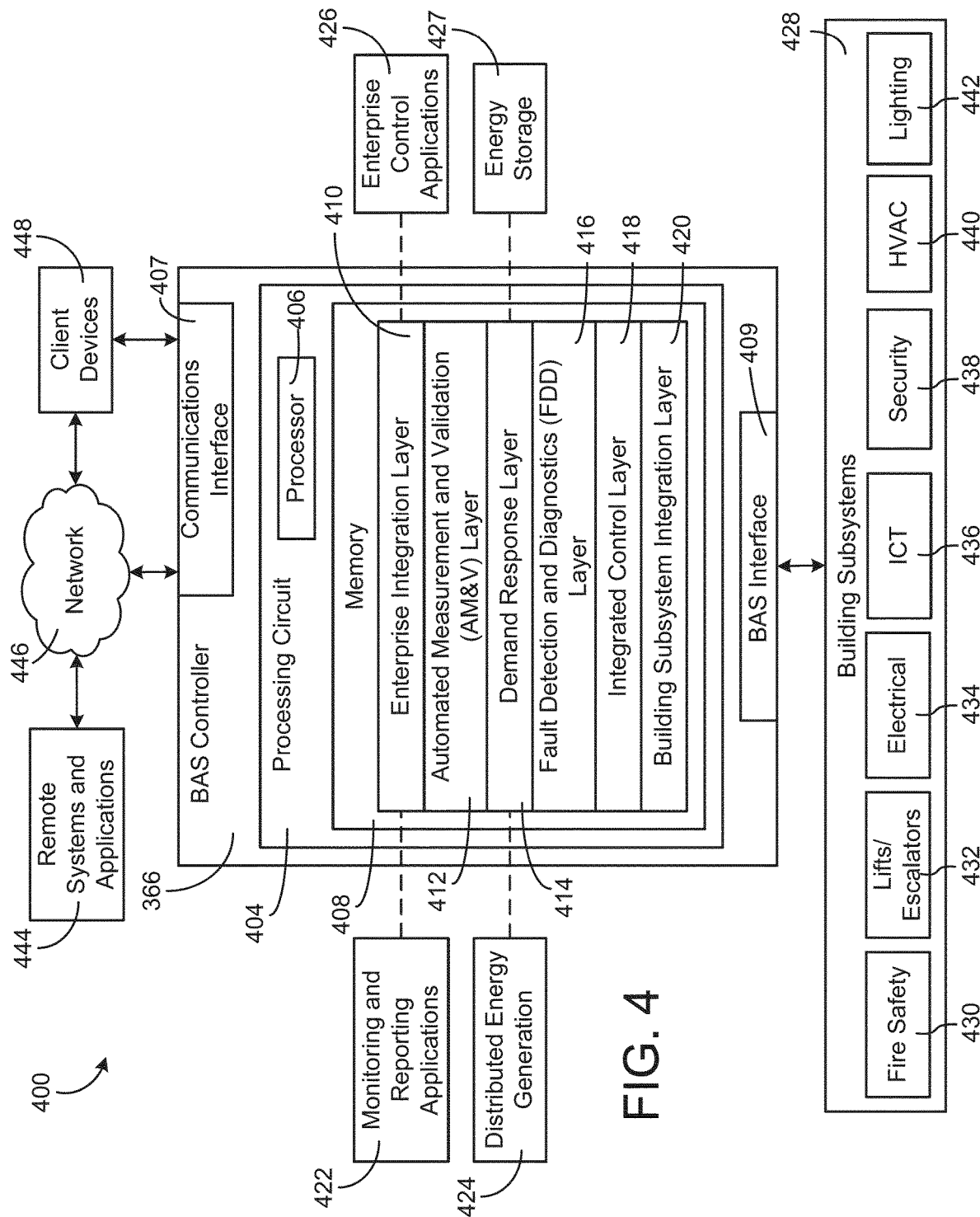
FIG. 4 is a block diagram of a BAS which can be used to monitor and control the building of FIG. 1, according to an exemplary embodiment.

Referring now to FIG. 4, a block diagram of a building automation system (BAS) 400 is shown, according to an exemplary embodiment. BAS 400 may be implemented in building 10 to automatically monitor and control various building functions. BAS 400 is shown to include BAS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BAS controller 366 is shown to include a communications interface 407 and a BAS interface 409. Interface 407 may facilitate communications between BAS controller 366 and external applications (e.g., monitoring and reporting applications 422, enterprise control applications 426, remote systems and applications 444, applications residing on client devices 448, etc.) for allowing user control, monitoring, and adjustment to BAS controller 366 and/or subsystems 428. Interface 407 may also facilitate communications between BAS controller 366 and client devices 448. BAS interface 409 may facilitate communications between BAS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BAS interface 409 is an Ethernet interface. In other embodiments, both communications interface 407 and BAS interface 409 are Ethernet interfaces or are the same Ethernet interface.

Still referring to FIG. 4, BAS controller 366 is shown to include a processing circuit 404 including a processor 406 and memory 408. Processing circuit 404 may be communicably connected to BAS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BAS controller 366 is implemented within a single computer (e.g., one server, one housing, etc.). In various other embodiments BAS controller 366 may be distributed across multiple servers or computers (e.g., that can exist in distributed locations). Further, while FIG. 4 shows applications 422 and 426 as existing outside of BAS controller 366, in some embodiments, applications 422 and 426 may be hosted within BAS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration layer 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BAS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BAS controller 366. In yet other embodiments, enterprise control applications 426 can work with layers 410-420 to optimize building performance (e.g., efficiency, energy use, comfort, or safety) based on inputs received at interface 407 and/or BAS interface 409.

Building subsystem integration layer 420 may be configured to manage communications between BAS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BAS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BAS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response. FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BAS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Figure 5:
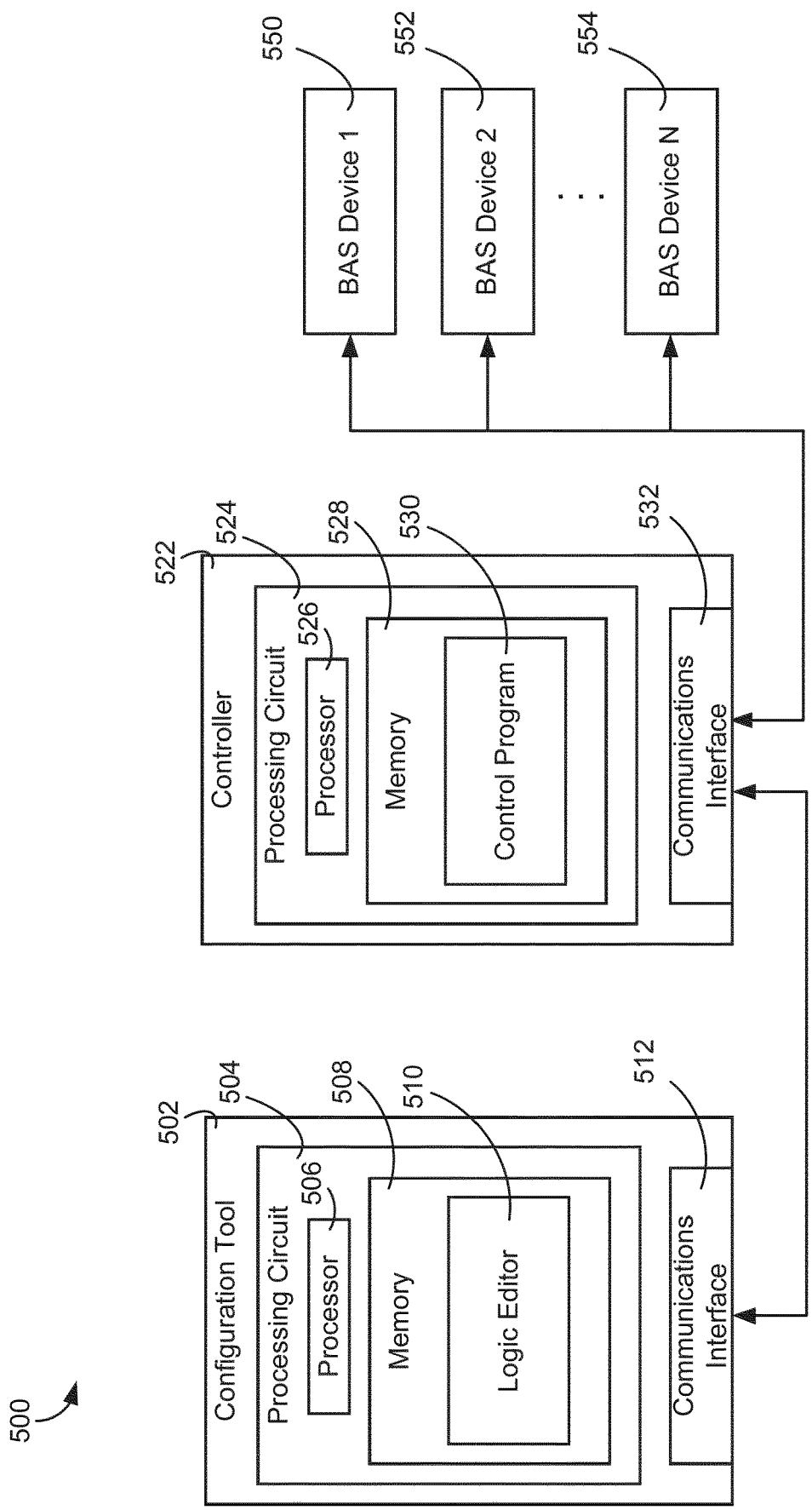
FIG. 5 is a block diagram of a system for automatically interacting with a flexible number of devices, according to an exemplary embodiment.

Systems and Methods for Automatically Interacting with a Flexible Number of Devices Referring to FIG. 5, a block diagram of a system 500 for automatically interacting with a flexible number of devices is shown, according to an exemplary embodiment. In some embodiments, system 500 can be a portion of the BAS 400. In other embodiments, system 500 can include some or all of the components of the BAS 400. Referring to FIG. 5, the system 500 can include a configuration tool 502, a controller 522, and a plurality of BAS devices 550-554.

Configuration tool 502 is shown to include a processing circuit 504 including a processor 506 and a memory 508, and a communication interface 512. Configuration tool 502 can be implemented as any computing device that can be operated by an operator, such as a service technician, a field engineer, a BAS site manage, etc. In some embodiments, configuration tool 502 can be implemented as or on the client device 368 as described in relation to FIG. 3. In some embodiments, memory 508 can include a logic editor 510 configured to generate a control program 530 that can be executed by the controller 522 to control a flexible number of BAS devices 550-554. Configuration tool 502 and operations performed by the configuration tool 502 are described herein below in more detail in the configuration tool section.

Controller 522 is shown to include a processing circuit 524 including a processor 526 and a memory 528, and a communication interface 532. Controller 522 can be any controller as described in relation to FIGS. 1-4, such as, AHU controller 330, BAS controller 366, etc. In some embodiments, memory 528 can include a control program 530 configured to control a flexible number of BAS devices 550-554. Controller 522 is described in greater detail herein below in relation to FIG. 6. BAS devices 550-554 can be any of devices in the building subsystems, such as HVAC devices, lighting devices, fire safety devices, etc., as described in relation to FIGS. 1-4.

Figure 6:
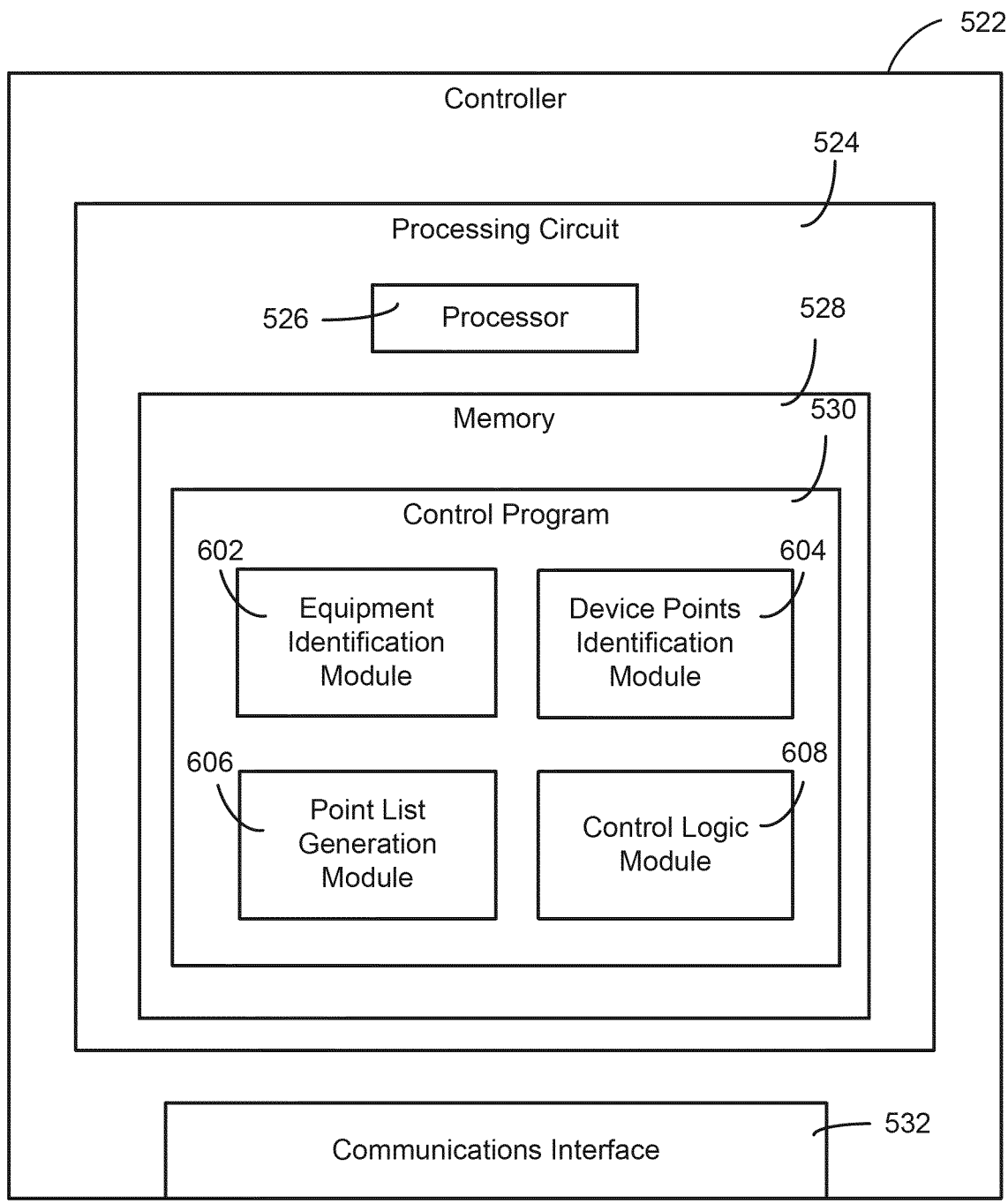
FIG. 6 is a block diagram illustrating a controller for automatically interacting with a flexible number of devices, according to an exemplary embodiment.

Referring now to FIG. 6, a block diagram illustrating controller 522 in greater detail is shown, according to an exemplary embodiment. Controller 522 can be any controller as described in relation to FIGS. 1-4 and can be a controller on a BAS device, such as a controller for an AHU, a chiller, or a space controller, a zone controller, etc. Controller 522 is shown to include a processing circuit 524 and a communications interface 532. Communications interface 532 may include wired or wireless interfaces (e.g., jacks, antennas, transmitters, receivers, transceivers, wire terminals, etc.) for conducting data communications with various systems, devices, or networks. For example, the communications interface 532 may include an Ethernet card and port for sending and receiving data via an Ethernet-based communications network and/or a Wi-Fi transceiver for communicating via a wireless communications network. The communications interface 532 may be configured to communicate via local area networks or wide area networks (e.g., the Internet, a building WAN, etc.) and may use a variety of communications protocols (e.g., BACnet, IP, LON, etc.). The communications interface 532 may include a network interface configured to facilitate electronic data communications between controller 522 and various systems or devices, such as a communications network, configuration tool 502, BAS devices 550-554, or any other controllers and devices in the BAS system as described in FIGS. 1-4. In some embodiments, the controller 522 can receive the control program 530 generated by the configuration tool 502 via the communication interface 532 with wired or wireless means. In some embodiments, the communications interface 532 may include a universal serial bus (USB) interface that may be communicably coupled to a USB port for receiving the control program 530 via a USB stick or other data storage device.

The processing circuit 524 is shown to include a processor 526 and a memory 528. In some embodiments, the processor 526 can be implemented as a special purpose processor, a general purpose processor, an application specific integrated circuit (ASIC), one or more field programmable gate arrays (FPGAs), a group of processing components, or other suitable electronic processing components. The processor 526 may be configured to execute computer code or computer-executable instructions stored in memory or received from other non-transitory computer readable media (e.g., CDROM, network storage, a remote server, etc.).

Memory 528 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 528 can be or include volatile memory or non-volatile memory. Memory 528 can include database components, object code components, script components, or any other type of information structure for supporting the various activities and information structures described in the present application. Memory 528 may be communicably connected to the processor via the processing circuit and may include computer code for executing (e.g., by the processor) one or more processes described herein. In some embodiments, the memory 528 can include at least the control program 530. The control program 530 can be generated by the configuration tool 502 and received via the communication interface 532. In some embodiments, the control program 530 can include an equipment identification module 602, a device point identification module 604, a point list generation module 606, and a control logic module 608. In some embodiments, modules 602-608 of the control program 530 stored in a non-transitory computer readable medium (e.g., memory 528) can be executed by the processor 526 to perform operations as described herein.

Referring now to FIGS. 1-6 together, in some embodiments, a plurality of devices can be configured to measure or generate a plurality of points in a building automation system. For example, BAS devices 550-554 can measure or generate a plurality of points in the BAS (e.g., BAS 400). In some embodiments, points can include any measured or calculated values indicating the performance of a BAS device (e.g., BAS devices 550-554) and/or the components thereof. For example, points can include one or more measured or calculated temperatures (e.g., refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, resource consumptions (e.g., power consumption, water consumption, electricity consumption, etc.), control setpoints, etc. In some embodiments, each point of the plurality of points is associated with a model class. A model class, for example, can be the type of the points. For example, a model class can include a specific type of temperatures (e.g., a zone temperature), a specific type of pressures (e.g., a evaporator pressure), a specific type of flow rates (e.g., a cold water flow rate), a specific type of positions (e.g., a valve position), a specific type of resource consumptions (e.g., a water consumption), etc. As an example, a BAS device such as a sensor can measure a zone temperature (model class) of 80° F. (point).

In some embodiments, the controller 522 can be configured to identify a primary list of N devices among the plurality of devices. N is an integer (e.g., 2, 3, 5, 10, 30). For example, the equipment identification module 602 can be configured to identify a list of devices or equipment. In some embodiments, the equipment identification module 602 can identify the primary list of N devices when the N devices relate to each other based on a predetermined criteria. For example, if 5 devices are related to each other because they are controlled by a same controller, the equipment identification module 602 can identify the 5 devices as items of the primary list. Using FIG. 5 as an example, assuming that the controller 522 is a controller of an AHU and the BAS devices 550-554 are VAVs. In this example, the equipment identification module 602 can identify the 3 VAVs 550-554 among a plurality of (e.g., 100) VAVs in building 10 as items of a primary list because these 3 VAVs are controlled or fed by the same AHU controller 522.

In some embodiments, the controller 522 can be configured to automatically identify a plurality of points on each of the N devices that are identified as items of the primary list. For example, the device points identification module 604 can be configured to automatically identify a plurality of points on each of the devices that are identified as items of the primary list. In some embodiments, the device points identification module 604 can search a database using the device as index. In some embodiments, the BAS system can include databases that maintain relationships between devices and points. For example, a common data model (CDM) database can store information that allows mapping or connection between devices and points on the devices. In some embodiments, responsive to the points on the device are identified, the device points identification module 604 can select a subset of points of the plurality of points to generate the secondary lists based on a determination that the subset of points are inputs to the control logic. A device may have many points, but not all points are inputs to a specific control logic to be performed. For example, a device may have 5 points available on it, but only 2 points are needed as inputs to a control logic that does a certain function (e.g., comparing two values). In such a case, only the 2 points are selected as points for generating the secondary lists of points.

In some embodiments, the controller 522 can be configured to automatically generate a plurality of secondary lists of points based on the primary list of N devices. For example, the point list generation module 606 can be configured to automatically generate a plurality of secondary lists of points. In some embodiments, responsive to the points on the devices are identified and selected, the point list generation module 606 can automatically create a number of secondary lists each having N items. The number of secondary lists can be equal to the number of points selected for each device. For example, if 2 points are selected for each device as described herein above, the point list generation module 606 generates 2 secondary lists. The point list generation module 606 then populates the secondary lists with the selected points. As a result, each secondary list includes N points. Each of the N points in each secondary list is associated with a respective device of the N devices in the primary list. In some embodiments, all N points within a same secondary list belong to a same model class, and points in different secondary lists belong to different model classes. For example, if the primary list includes 3 devices, and 2 points (e.g., a zone temperature and a zone set point) are selected for each device, two secondary lists can be generated. That is, a list of 3 zone temperature values and a list of 3 zone set point values can be generated. As can be seen, in this example, all 3 points within the first secondary list belong to the zone temperature model class and all 3 points within the second secondary list belong to the zone set point model class. In some embodiments, all N points in a secondary list are of a same data type. For example, all points within a same secondary list are all analog data type, or all Boolean data type, or all float data type, in some embodiments. An illustration of the automatic generation of multiple secondary lists at runtime is shown with reference to FIGS. 7A-7B.

In some embodiments, the controller 522 can be configured to provide the plurality of secondary lists of points as inputs to a control logic. For example, the control logic module 608 can be configured to provide the plurality of secondary lists of points as inputs to a control logic. In some embodiments, the control logic module 608 can include one or more control logics for performing one or more control functions. The control logic can use the plurality of secondary lists of points to generate one or more control signals to control the N devices, such as the BAS devices 550-554. For example, if the control logic is to add two inputs and produce a sum as output, the control logic can add the corresponding points in the two lists to generate a list of sums. For instance, if input point list 1={12, 15, 10} and input point list 2={99, 101, 80}, a control logic for performing the sum function can produce an output point list of {111, 116, 90}. The controller 522 can use each item in the output point list to generate a respective control signal to control the respective 3 BAS devices 550-554. In some embodiments, one of the inputs to the control logic can be an individual point, rather than a list of points. For example, if a control logic is configured to take 2 point lists and a single point as inputs and produce a sum of the three inputs, the single input can be added to each point of the sum of the two point lists and produce a final output point list. Continuing with the above example, if input point list 1={12, 15, 10}, input point list 2={99, 101, 80}, and the third input is a single point of 10, the final output point list is {121, 126, 100}.

In some embodiments, the BAS devices controlled by the controller 522 can be changed. For example, one or more BAS devices can be added to the BAS device list controlled by the controller 522 and/or one or more of the BAS devices 550-554 can be removed. The controller 522 can be configured to work with the flexible quantity of devices. For example, if the number of devices controlled by the controller 522 is changed from N to M, where M is an integer and M does not equal to N (or in the event that N=M, but the list contains different devices), the control program 530 executed by the processor 526 can identify a second primary list of M devices among the plurality of devices. The control program 530 executed by the processor 526 can automatically generate a second plurality of secondary lists of points based on the second primary list of M devices. Each of the second plurality of secondary lists includes M points, each of the M points is associated with a respective device of the M devices, all M points within a same second secondary list belong to a same model class, and points in different second secondary lists belong to different model classes. The control program 530 executed by the processor 526 can provide the second plurality of secondary lists of points as inputs to the control logic configured to use the second plurality of secondary lists of points to generate one or more control signals to control the M devices.

Figure 7A:
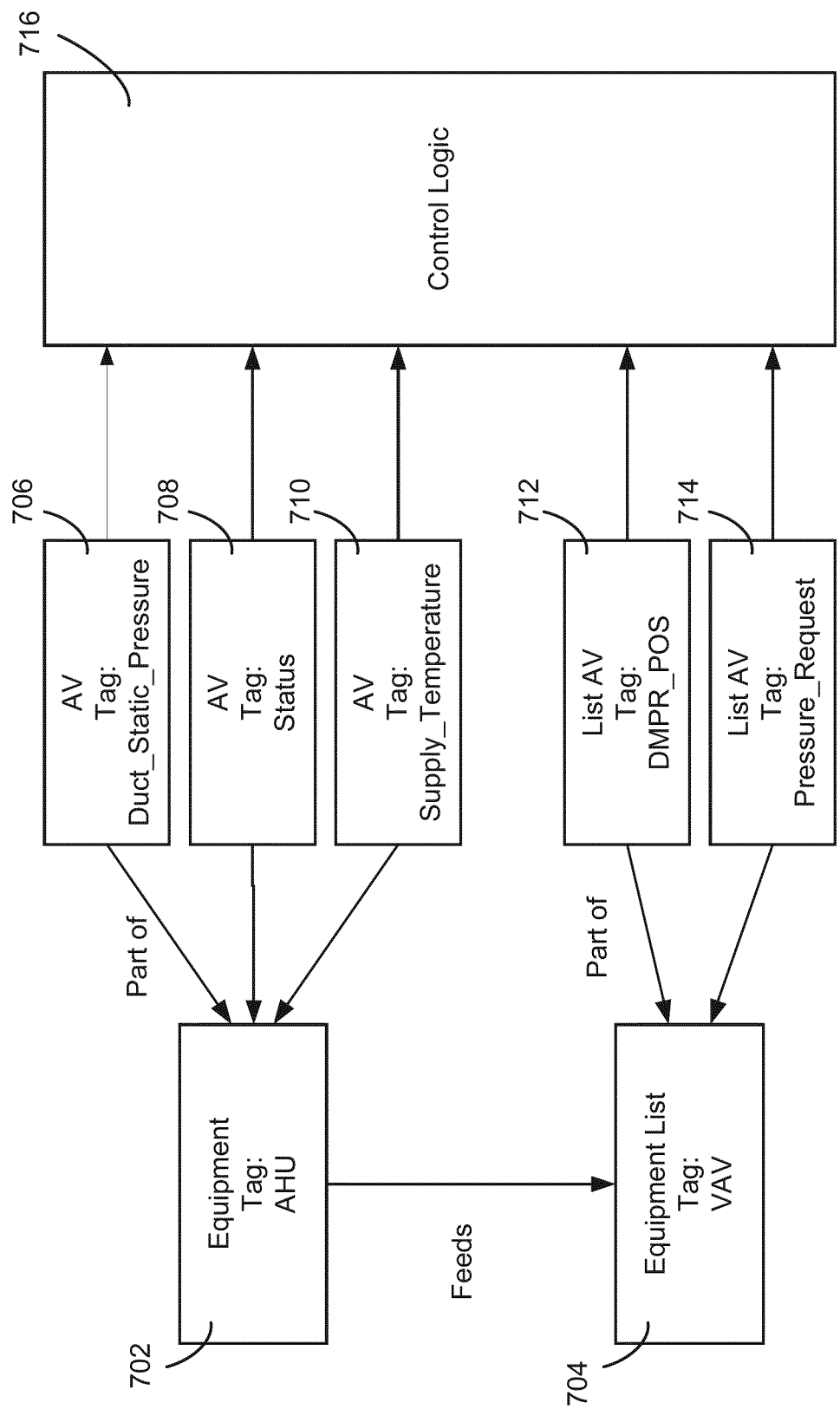
FIG. 7A is a block diagrams illustrating automatic generation of multiple point lists, according to an exemplary embodiment.
Figure 7B:
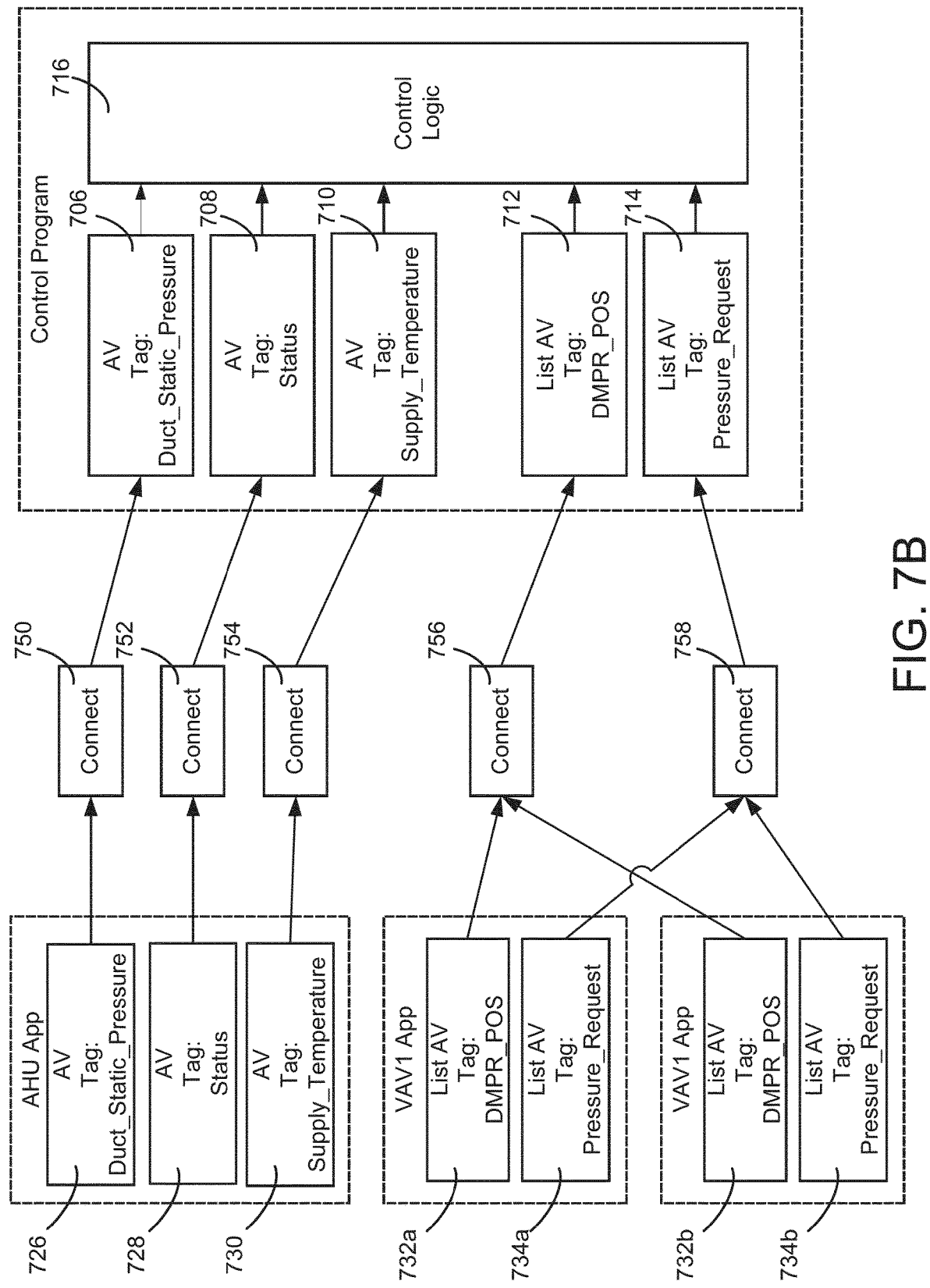
FIG. 7B is a block diagrams illustrating automatic generation of multiple point lists, according to an exemplary embodiment.

Referring now to FIGS. 7A-7B, block diagrams illustrating automatic generation of multiple point lists are shown, according to an exemplary embodiment. FIG. 7A shows a state of objects created for generating point lists to be used as inputs to a control logic. As shown in FIG. 7A, control logic 716 takes three individual points (an analog value (AV) of Duct_Static_Pressure 706, an AV of Status 708, and an AV of Supply_Temperature 710) and two point lists (a list of AV of DMPR_POS (damper positions) 712, and a list of AV of Pressure_Request 714) as inputs. The three individual points 706, 708 and 710 are points on an Equipment AHU 702, and the two point lists 712 and 714 contain points on multiple VAVs (Equipment List) 704. For example, with reference to FIG. 5, AHU 702 can be the device that hosts controller 522, and the list of VAVs can be BAS devices 550-554 that are controlled/fed by controller 522. In some embodiments, at the time of FIG. 7A, a list of devices 704 are identified, and point lists 712 and 714 are defined. Similarly, an individual device 702 is identified and individual points 706-710 are defined.

FIG. 7B shows how the lists of points are automatically populated at runtime. Referring to FIG. 7B, a plurality of connect objects 750-758 that are created by the control program 530 are instantiated. The connect objects 750-758 can automatically connect the inputs of the control logic and the actual points (values) on the devices. For example, connect objects 750, 752 and 754 connect inputs 706, 708 and 710 to the AV of Duct_Static_Pressure 726, AV of Status 728, and AV of Supply_Temperature 730 on the AHU, respectively. Connect object 756 connects the list input 712 to the respective AVs of DMPR_POS on each of the VAV1 and VAV2, in some embodiments. For example, if list input 712 has two entries in the list, the connect object 756 connects the first entry in list 712 to the AV DMPR_POS 732a on VAV1 and connects the second entry in list 712 to the AV DMPR_POS 732b on VAV2. Similarly, with respect to list input 714, the connect object 758 connects the first entry in list 714 to the AV Pressure_Request 734a on VAV1 and connects the second entry in list 714 to the AV Pressure_Request 734b on VAV2. In some embodiments, the connections between entries in the lists and the actual point values on the devices can be realized by a database (e.g., CDM database) that maintains relationships between devices and points, as described herein above. In some embodiments, with the connections being made, both the individual inputs and list inputs are automatically populated with the actual values on the devices.

The example operations of the control program 530 when it is executed by the processor 526 of the controller 522 for automatically interacting with a flexible number of devices are discussed. It should be understood that those components and operations are for illustrative purposes only and should not be regarded as limiting. Next, the configuration tool 502 that generates the control program 530 is discussed.

Configuration Tool 502

Referring back to FIG. 5, configuration tool 502 is shown to include the processing circuit 504 and the communication interface 512. Communications interface 512 allows the configuration tool 502 to communicate with other devices within and outside of the system 500. In some embodiments, the communications interface 512 includes wired or wireless interfaces (e.g., jacks, antennas, transmitters, receivers, transceivers, wire terminals, etc.) for conducting data communications with various systems, devices, or networks. For example, the communications interface 512 may include an Ethernet card and port for sending and receiving data via an Ethernet-based communications network and/or a Wi-Fi transceiver for communicating via a wireless communications network. In some embodiments, the configuration tool 502 can transmit the control program 530 generated by the configuration tool 502 to the controller 522 via the communication interface 512 with wired or wireless means.

The processing circuit 504 is shown to include a processor 506 and a memory 508. In some embodiments, the processor 506 can be implemented as a special purpose processor, a general purpose processor, an application specific integrated circuit (ASIC), one or more field programmable gate arrays (FPGAs), a group of processing components, or other suitable electronic processing components. The processor 506 may be configured to execute computer code or computer-executable instructions stored in memory or received from other non-transitory computer readable media (e.g., CDROM, network storage, a remote server, etc.).

Memory 508 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 508 can be or include volatile memory or non-volatile memory. Memory 508 can include database components, object code components, script components, or any other type of information structure for supporting the various activities and information structures described in the present application. Memory 508 may be communicably connected to the processor via the processing circuit and may include computer code for executing (e.g., by the processor) one or more processes described herein. In some embodiments, memory 508 can include a logic editor 510 configured to generate the control program 530 that can be executed by the controller 522 to control a flexible number of BAS devices 550-554, as described herein above.

Figure 16A:
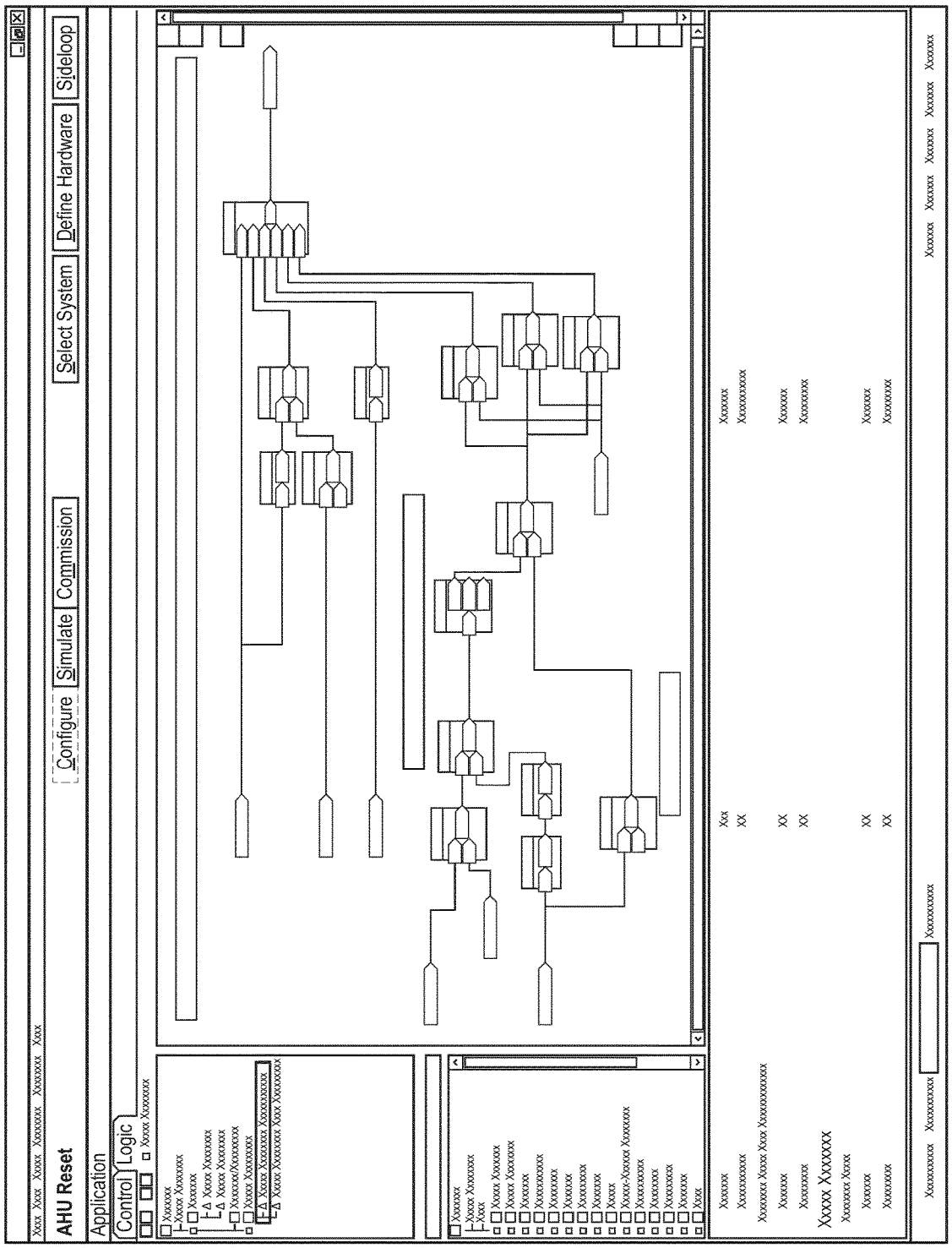
FIG. 16A shows an example configuration tool with an example logic editor, according to an exemplary embodiment.
Figure 16B:
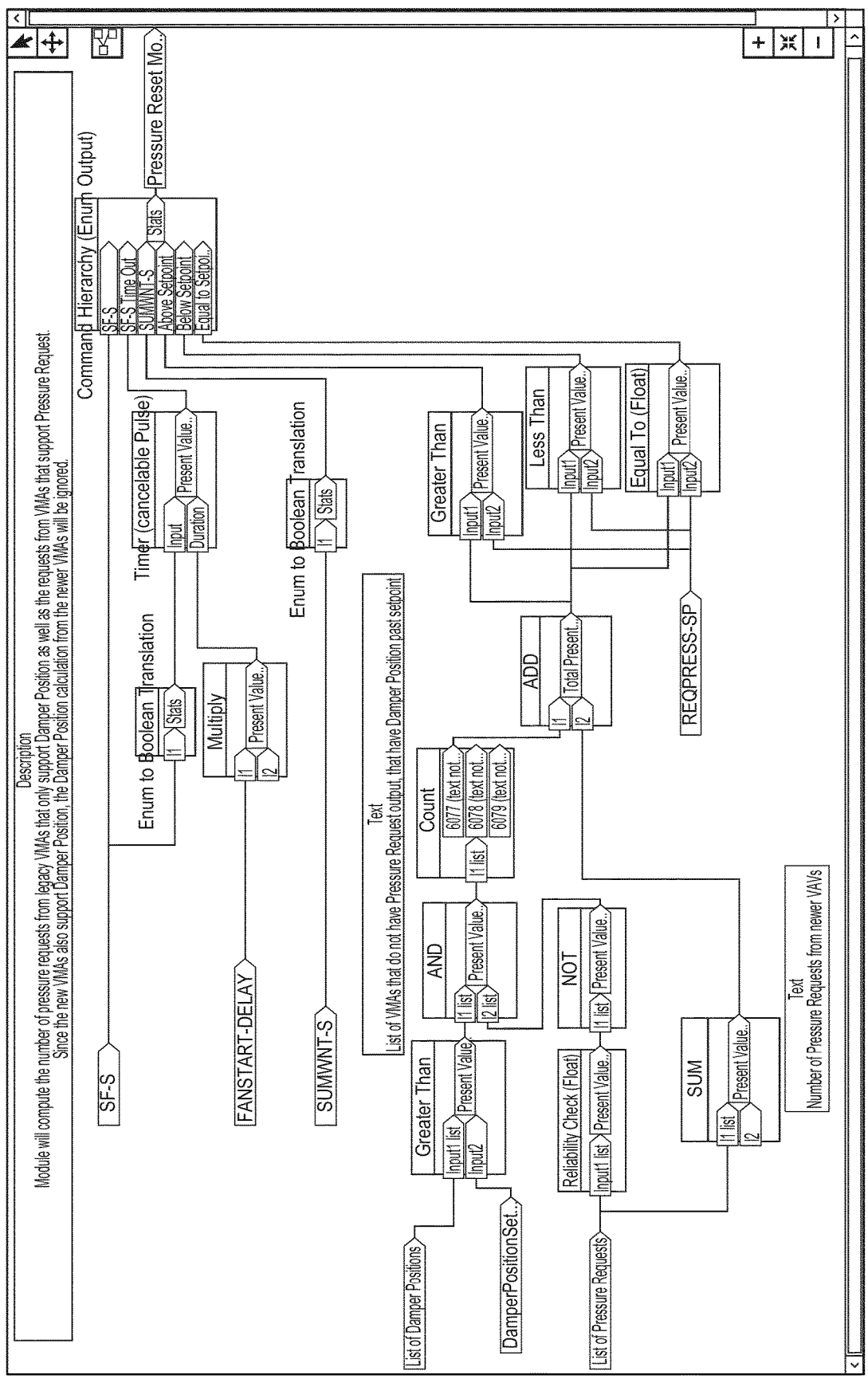
FIG. 16B is a continuation of FIG. 16A and shows the example configuration tool with the example logic editor, according to an exemplary embodiment.
Figure 17:
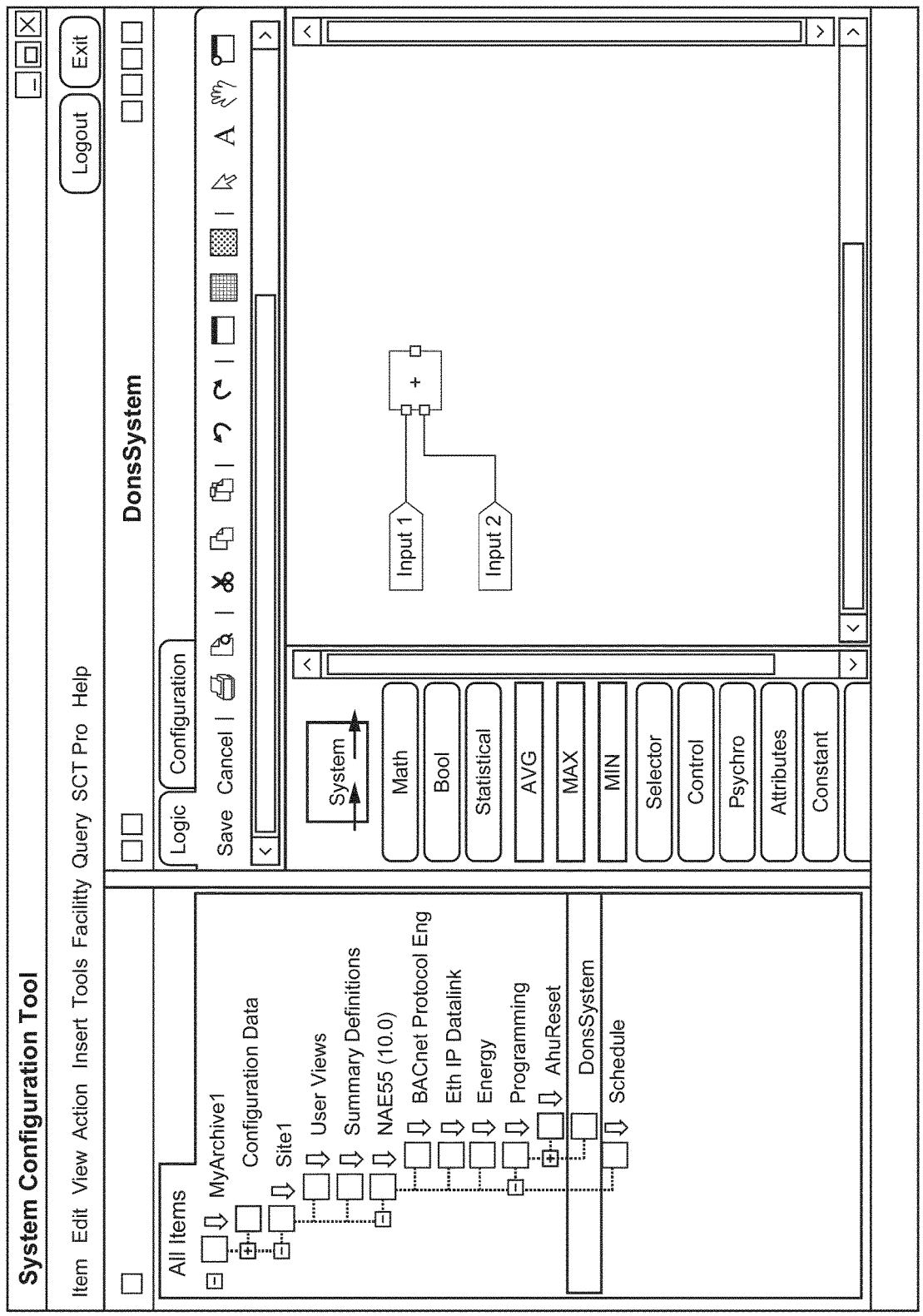
FIG. 17 shows another example configuration tool with an example logic editor, according to an exemplary embodiment.

In some embodiments, the logic editor 510 is a graphical user interface for building models to generate applications for controllers (e.g., programmable field controllers), such as the control program 530 for controller 522. FIGS. 16A and 16B show an example configuration tool with an example logic editor, according to an exemplary embodiment. FIG. 17 shows another example configuration tool with an example logic editor, according to an exemplary embodiment.

FIGS. 8A-8F illustrate an example of using the logic editor of the configuration tool 502 to create a control program that can automatically interacting with a flexible number of devices. The example control program created in FIGS. 8A-8F can be a duct static pressure reset application, in some embodiments. Referring to FIGS. 8A-8F, an example logic editor 800 is shown. The logic editor 800 can be the logic editor 510 of the configuration tool 502. As shown in FIGS. 8A-8F, the logic editor 800 includes a palette 802 and a canvas 804. In some embodiments, the palette 802 includes a plurality of blocks, including an equipment block 806, a space block 808, a point block 810, an output block 812, a AND block 814, a OR block 816, a XOR block 818, a NOT block 820, a reliability check block 822, an expression block 824, a span block 826, a rate limit 828, a X>Y block 830, a X<Y block 832, a X<=Y block 834, a X>=Y block 836, and a X< >Y block 838.

Figure 8A:
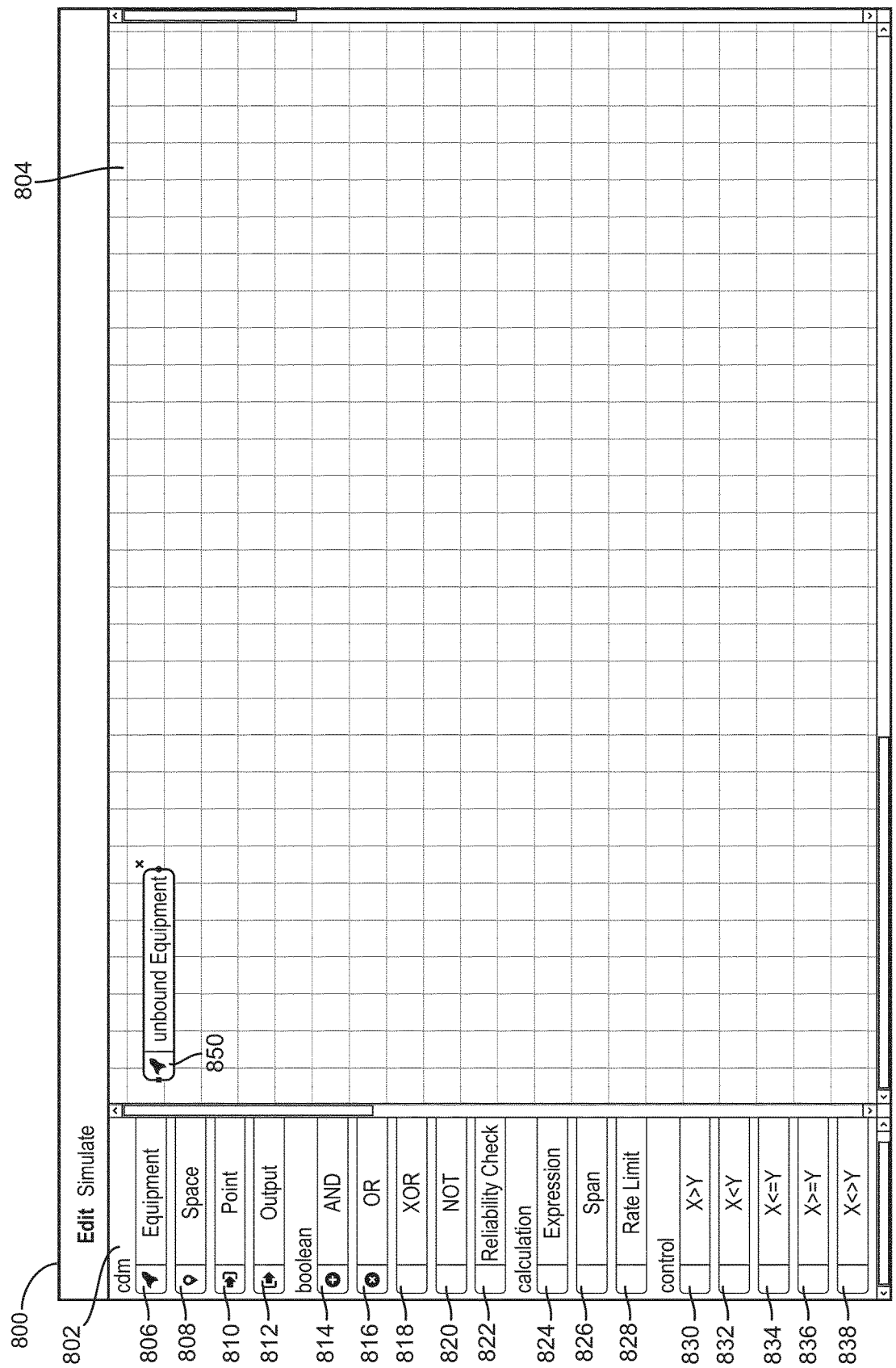
FIG. 8A illustrates an example of using a logic editor of a configuration tool to create a control program that can automatically interacting with a flexible number of devices, according to an exemplary embodiment.

Referring now to FIG. 8A, a user (e.g., a service technician, a field engineer) drags an equipment block 806 from the palette 802 to the canvas 804. The equipment block is shown as "unbound equipment" block 850 in the canvas 804.

Figure 8B:
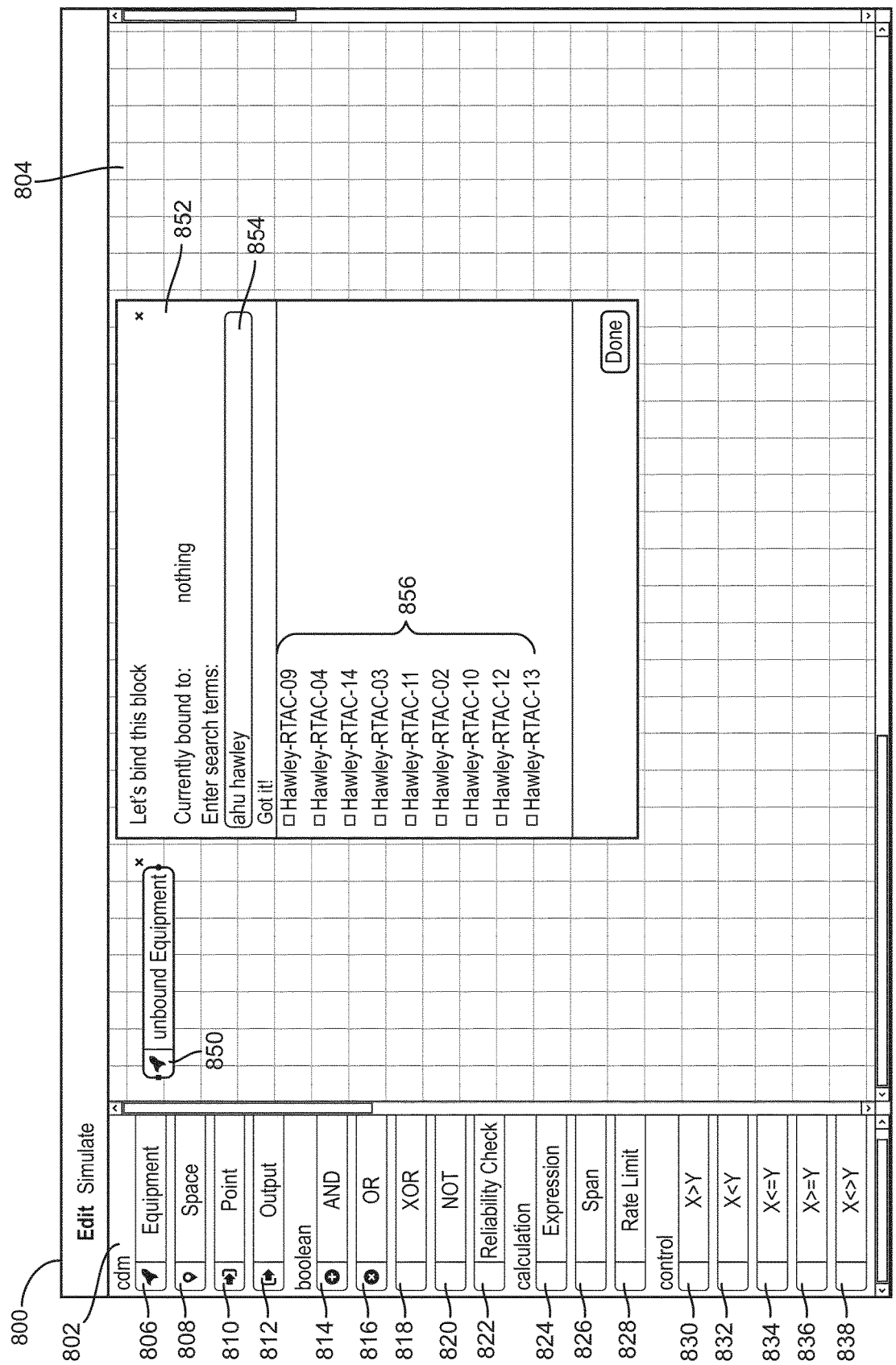
FIG. 8B illustrates an example of using the logic editor of the configuration tool to create a control program that can automatically interacting with a flexible number of devices, according to an exemplary embodiment.

Next, referring to FIG. 8B, the user can click on the "unbound equipment" block 850 and a pop up window 852 is brought up. The pop up window 852 includes a search box 854 which allows the user to search for "generic" concepts (e.g., "AHU," "VAV") and building specific terms (e.g., "Hawley") from databases (e.g. CDM database). In this example, the user enters the search term "ahu hawley." As shown in FIG. 8B, the search result is a list of equipment or devices 856 (e.g., Hawley-RTAC-09, Hawley-RTAC-04, . . . ) that match the search criterion (based on name, fqr, description, etc).

Figure 8C:
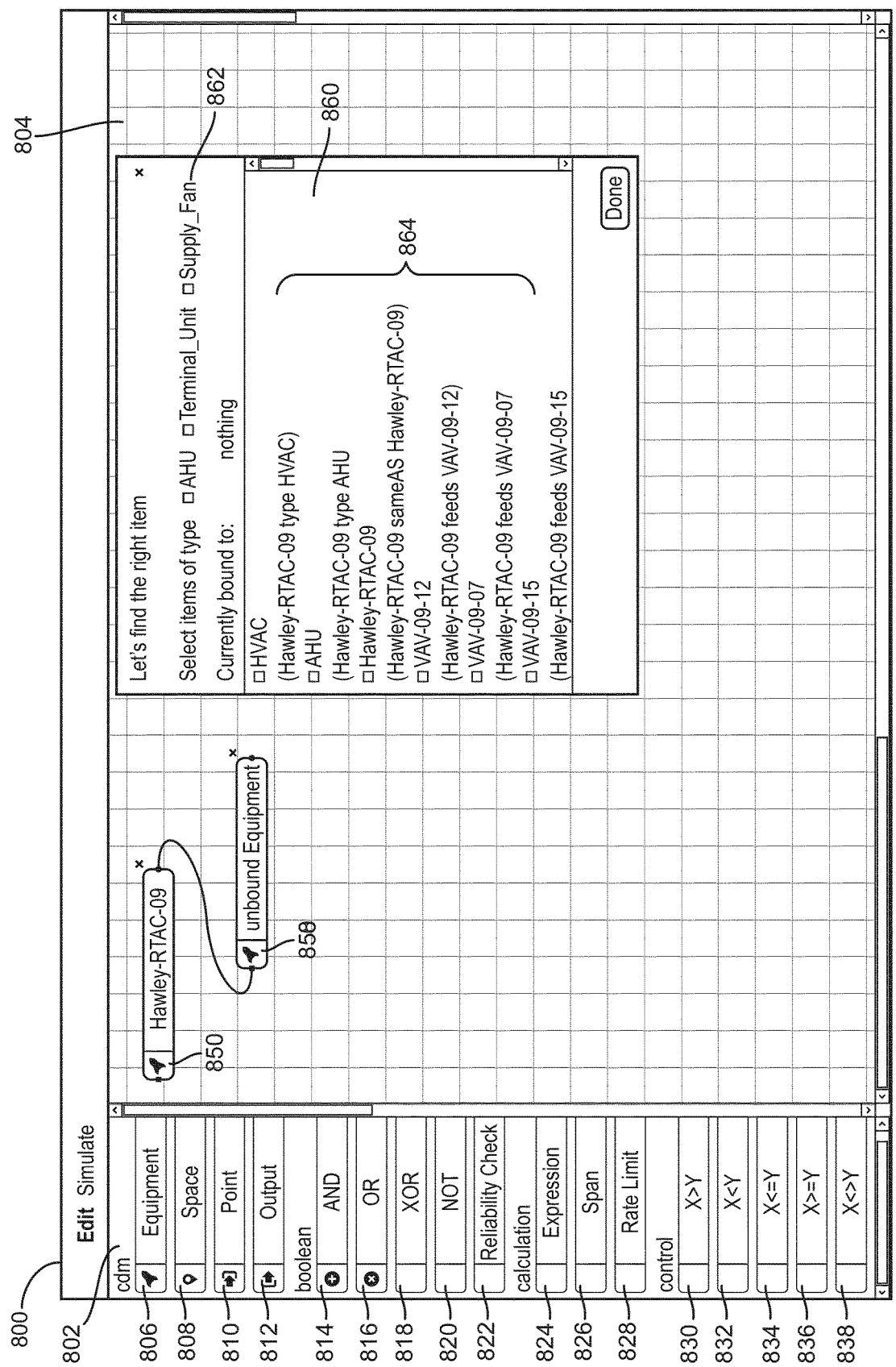
FIG. 8C illustrates an example of using the logic editor of the configuration tool to create a control program that can automatically interacting with a flexible number of devices, according to an exemplary embodiment.

Next, referring to FIG. 8C, the user selects a specific AHU (Hawley-RTAC-09) from the list 856. As a result, "unbound equipment" block 850 is now bound to "Hawley-RTAC-09" and becomes "Hawley-RTAC-09" block 850, as shown in FIG. 8C. User then drags another equipment block 806 from the palette 802 to the canvas 804. The second equipment block is shown as an "unbound equipment" block 858 in the canvas 804. The user connects "Hawley-RTAC-09" block 850 and "unbound equipment" block 858. As a result, the "unbound equipment" block 858 now has a parent context (of Hawley-RTAC-09) and a pop up window 860 is shown. In some embodiments, the pop up window 860 can show all equipment 864 that are related to "Hawley-RTAC-09" in some way. Pop up window 860 as shown also includes a plurality of boxes 862 allowing the user to "select items of type" from a list of choices (e.g., AHU, Terminal Unit, Supply_Fan) in this example.

Figure 8D:
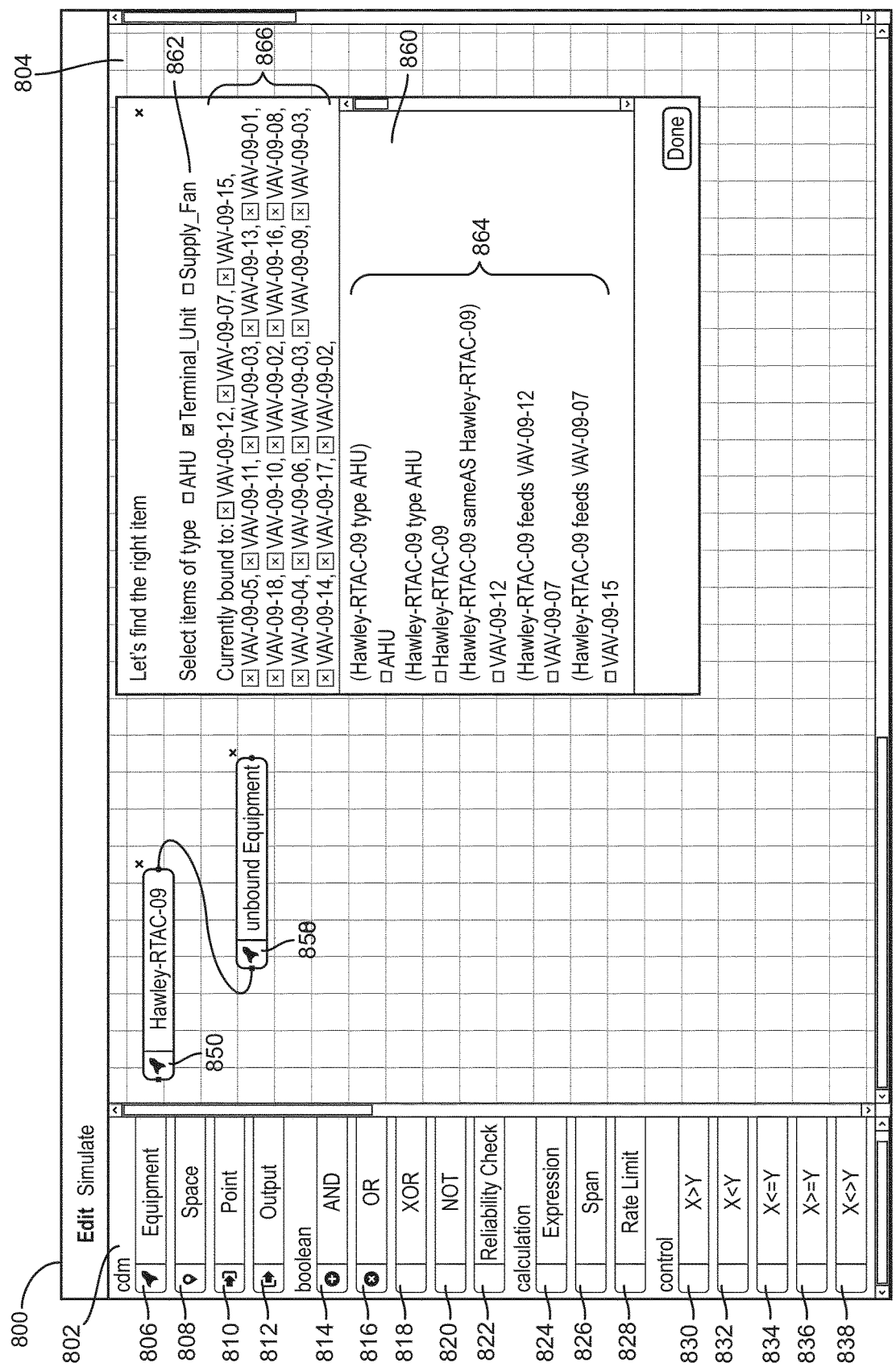
FIG. 8D illustrates an example of using the logic editor of the configuration tool to create a control program that can automatically interacting with a flexible number of devices, according to an exemplary embodiment.

Next, referring to FIG. 8D, the user can select individual equipment from list 864 or equipment by type from field 862. As shown in FIG. 8D, when the user selects "Terminal_Unit" box in the "select items of type" field 862, all 20 terminal units associated with "Hawley-RTAC-09" are selected as shown in the list 866. As a result, "unbound equipment" block 858 is now bound to all 20 terminal units and becomes "(20) Terminal_Unit" block 858 as shown in FIG. 8D. By now, a list of equipment/devices (represented by block 858) are identified.

Figure 8E:
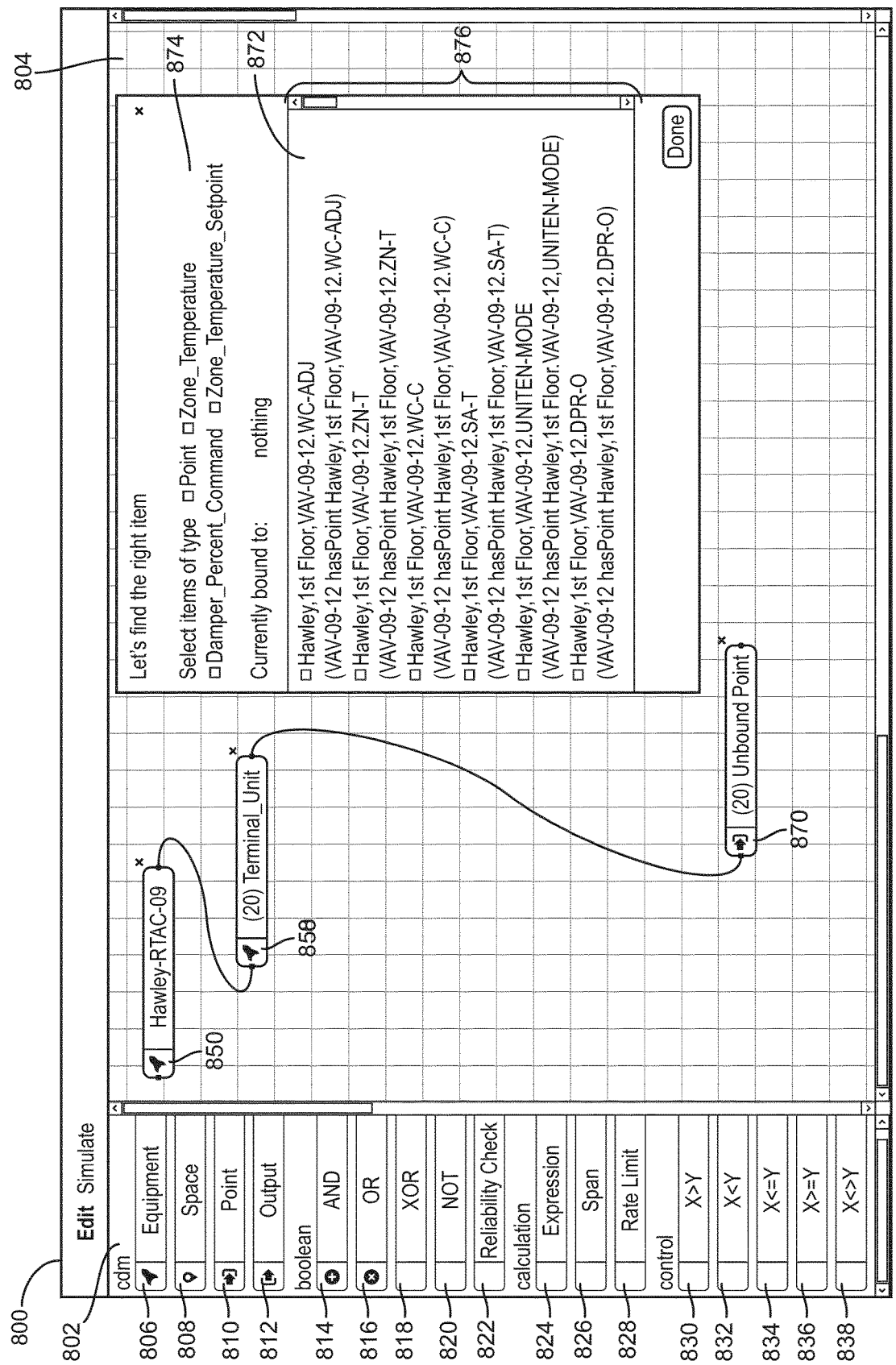
FIG. 8E illustrates an example of using the logic editor of the configuration tool to create a control program that can automatically interacting with a flexible number of devices, according to an exemplary embodiment.

Next, referring to FIG. 8E, the user can drag a point block 810 from the palette 802 to the canvas 804. The point block is shown as "unbound point" block 870 in the canvas 804. The user connects the "unbound point" block 870 and "the "(20) Terminal_Unit" block 858 representing a list of equipment. As a result, the "unbound point" block 870 now has a parent context (of all equipment in the list represented by block 858) and a pop up window 872 is shown. In some embodiments, the pop up window 872 can show all points 876 that are related to "(20) Terminal_Unit" block 858 in some way. Pop up window 872 as shown also includes a plurality of boxes 874 allowing the user to "select items of type" from a list of choices (e.g., Point, Zone_Temperature, Damper_Percent_Command) in this example. The user can then select individual points from list 876 or by type from field 874. For example, if the user selects Damper_Percent_Command, the "unbound point" block 870 can be bound to the "Damper_Percent_Command" points on all 20 terminal units, and the "unbound point" block 870 becomes "(20) Damper_Percent_Command" block 870 as shown in FIG. 6F. By now, a list of Damper_Percent_Command points are created.

Figure 8F:
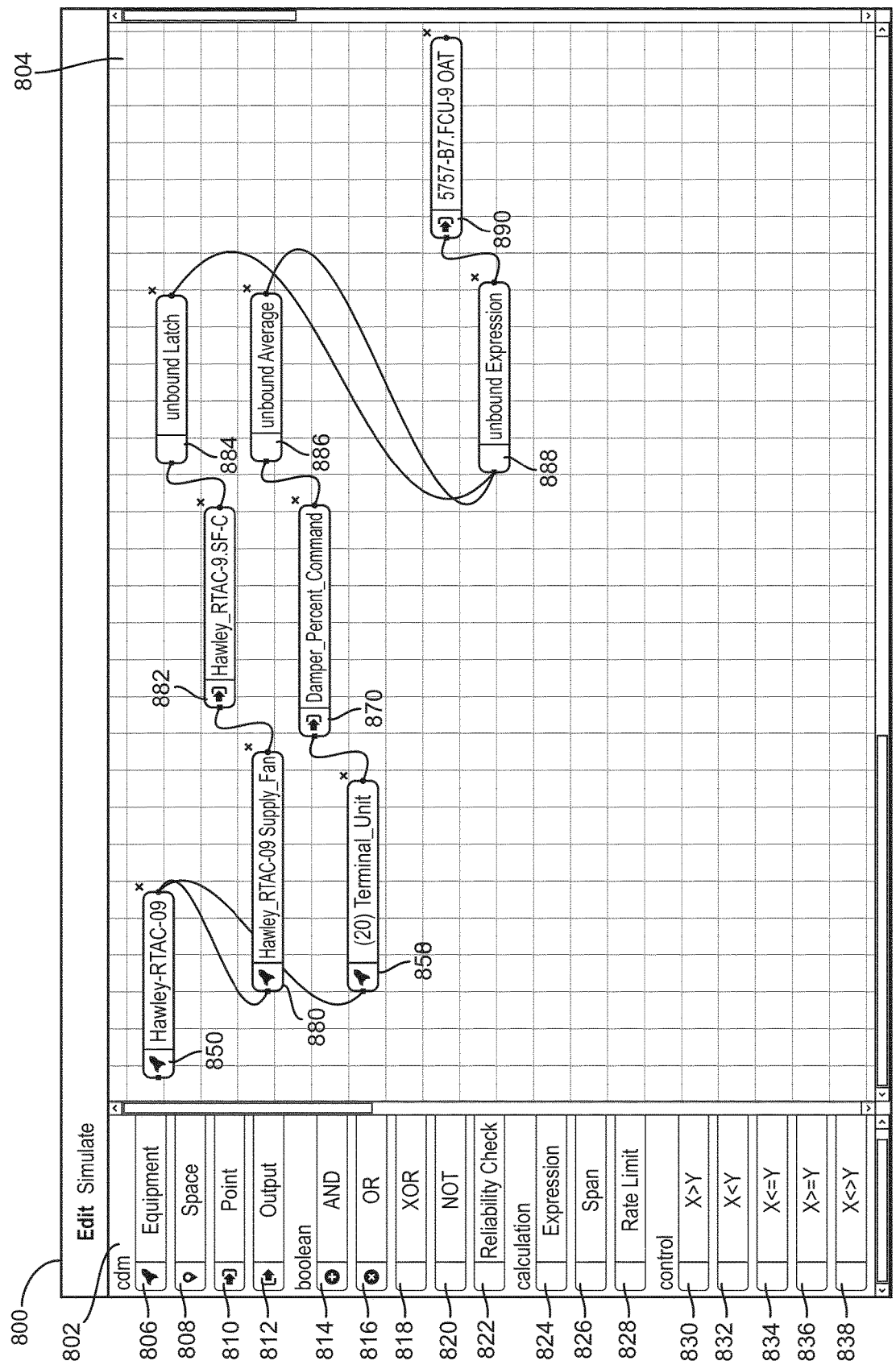
FIG. 8F illustrates an example of using the logic editor of the configuration tool to create a control program that can automatically interacting with a flexible number of devices, according to an exemplary embodiment.

Next, referring to FIG. 8F, a result of the example control application in the forms of blocks created using the logic editor 800 is shown. Similar to the operations as described in relation to FIGS. 8A-8E, a user can connect point, equipment, and space blocks to ultimately reach a list of points. As shown in FIG. 8F, in addition to the equipment list block 858 and point list block 870 created as described in relation to FIGS. 8A-8E, an equipment block 880 and an individual point block 882 have also been created. The individual point block 882 is taken as input in the form of an individual point to the math block 884, while the point list 870 is taken as input in the form of a point list to the math block 886. In this example, the math block 884 can output an individual point and the math block 886 can output a list of points. The individual point output and the list of points output can be taken as inputs to block 888 which generates an output which is then written to a point block 890.

Figure 9:
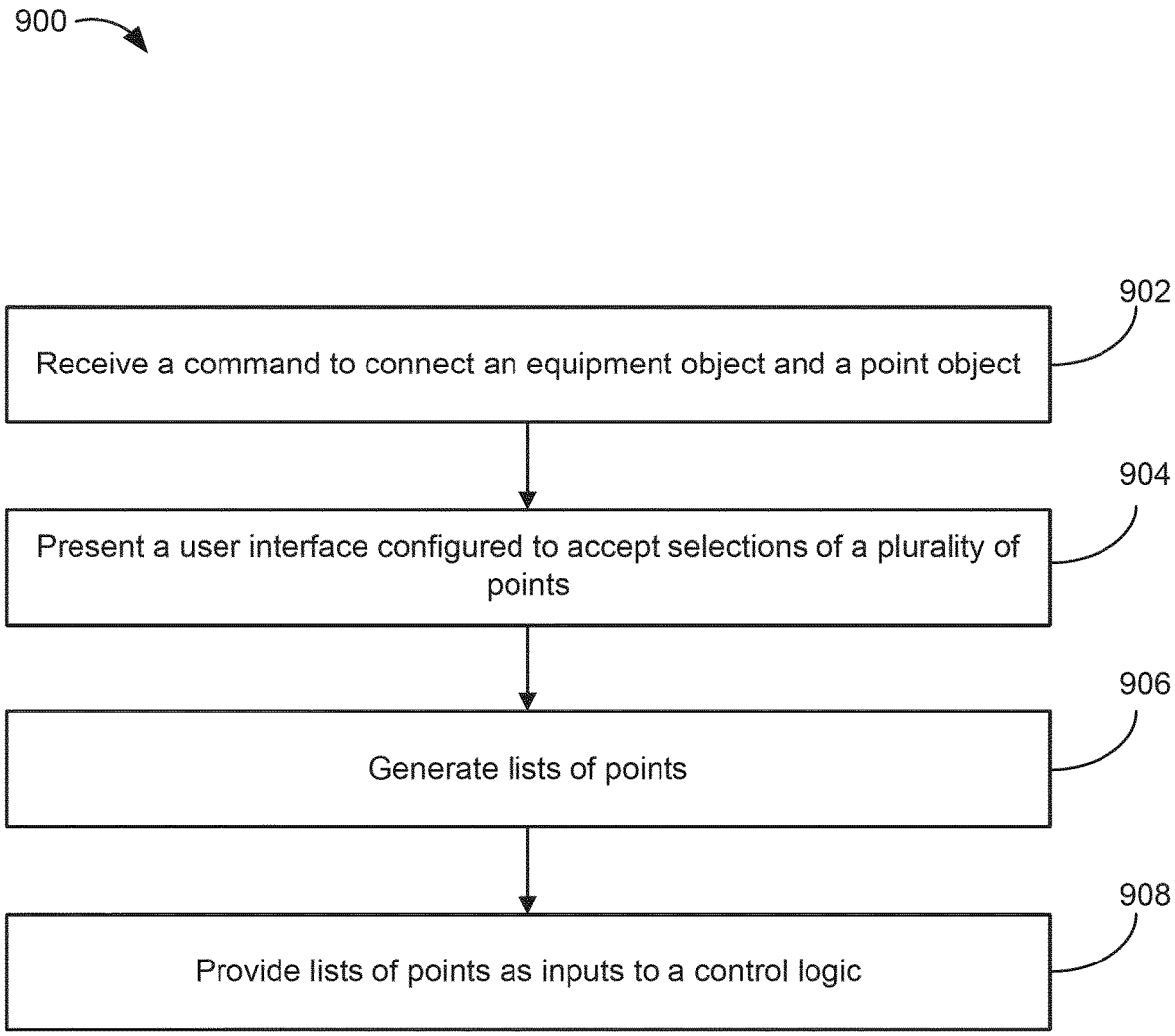
FIG. 9 is a flow diagram of a process for automatically interacting with a flexible number of devices, according to an exemplary embodiment.

Referring to FIG. 9, a flow diagram of a process 900 for automatically interacting with a flexible number of devices is shown, according to an exemplary embodiment. The process 900 can be performed by the configuration tool 502 for automatically interacting with a flexible number of devices. For example, the processor 506 of the configuration tool 502 can be configured to perform the process 900.

The process can include receiving a command to connect an equipment object and a point object (Step 902). For example, the configuration tool 502 can receive a command to connect the equipment block 858 and the point block 870 as shown in FIG. 8E. In some embodiments, the equipment object represents a list of N devices configured to measure or generate a plurality of points in a building automation system. N is an integer (e.g., 2, 3, 5, 10, 30). For example, the equipment block 858 can represent a plurality of N devices, such as 20 VAV terminal units or the 3 BAS devices 550-554 as shown in FIG. 5. In some embodiments, the 20 VAV terminal units or the 3 BAS devices 550-554 can measure or generate a plurality of points in the BAS (e.g., BAS 400). In some embodiments, points can include any measured or calculated values indicating the performance of a BAS device and/or the components thereof. For example, points can include one or more measured or calculated temperatures (e.g., refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, resource consumptions (e.g., power consumption, water consumption, electricity consumption, etc.), control setpoints, etc. In some embodiments, each point of the plurality of points is associated with a model class. A model class, for example, can be the type of the points. For example, a model class can include a specific type of temperatures (e.g., a zone temperature), a specific type of pressures (e.g., a evaporator pressure), a specific type of flow rates (e.g., a cold water flow rate), a specific type of positions (e.g., a valve position), a specific type of resource consumptions (e.g., a water consumption), etc. As an example, a BAS device such as a sensor can measure a zone temperature (model class) of 80° F. (point).

The process can include presenting a user interface configured to accept selections of a plurality of points on the devices (Step 904). For example, a user interface (e.g., a logic editor 800) can be configured to accept selections of a plurality of points on the N devices. In some embodiments, a user can select a plurality of points associated with the devices. In some embodiments, the user interface can be configured to allow searching for the list of N devices. For example, the user interface can include a search box and a user can enter search terms relating to, for example, an AHU. As a result, all VAVs controlled by the AHU can be presented as the search result.

The process can include generating one or more lists of points responsive to receiving the selections of the plurality of points on the devices (step 906). For example, upon receiving selections of the plurality of points on the devices, the configuration tool 502 can generate one or more lists of points (e.g., a list of Damper_Percent_Command points). In some embodiments, each list of points can include N points, each of the N points in each list of points can be associated with a respective device in the list of N devices, all N points within a same list of points can belong to a same model class, and points in different lists of points can belong to different model classes. For example, the list of Damper_Percent_Command points 870 as shown in FIG. 8F can include 20 Damper_Percent_Command points, each of these points is associated with a respective terminal unit in the list of equipment 858 representing 20 terminal units, and all 20 points in the list of Damper_Percent_Command points belong to a same model class (Damper_Percent_Command). For example, the configuration tool 502 can also generate a list of zone temperature points associated with the list of equipment 858 representing 20 terminal units. In such a case, all 20 points in the list of zone temperature points belong to a same model class (zone temperature), and the points in the list of Damper_Percent_Command points and the points in the list of zone temperature points belong to different model classes (e.g., one is Damper_Percent_Command and another is zone temperature).

The process can include providing the one or more lists of points as inputs to a control logic configured to use the one or more lists of points to generate a control signal to control the N devices (Step 908). For example, the list of Damper_Percent_Command points 870 as shown in FIG. 8F can be provided as input to the block 886 representing a control logic. In some embodiments, the control logic 886 can be configured to use the list of Damper_Percent_Command points 870 to generate a control signal to control the N devices (e.g., 20 terminal units).

Advantages of the Systems and Methods of the Present Disclosure

Systems and methods as described herein can allow automatic generation of lists of points based on a list of equipment and can use the generated lists of points as inputs to control logics. As a result, applications generated using the systems and methods as described herein can handle a variable number or quantity of equipment without going through the time consuming and costly customization. In some embodiments, the inputs and outputs of the application can specify criteria that can be used to query against the equipment and relationships that are part of a database (e.g., CDM database) to automatically generate the connections of the application with inputs and outputs in the system. For example, an application to reset the fan speed of an AHU needs the damper positions of all VAVs associated with the particular AHU. With the systems and methods of the present disclosure, the application can now be designed with a list input and can use a connect object (e.g., connect objects 756, 758 in FIG. 7B) with search criteria to provide the damper positions of all VAVs associated with the AHU. In this example, by simply selecting an AHU to apply the AHU reset application to, a database (e.g., CDM database) can be automatically queried to find all associated VAVs, and from the associated VAVs, the points that return the damper positions can be found, in some embodiments. In some embodiments, the connection between the damper position objects and the list input can be automatically generated, and the application and connections can be downloaded and running with minimal user involvement. FIGS. 10-11 illustrate advantages of the systems and methods of the present disclosure with additional examples.

Figure 10A:
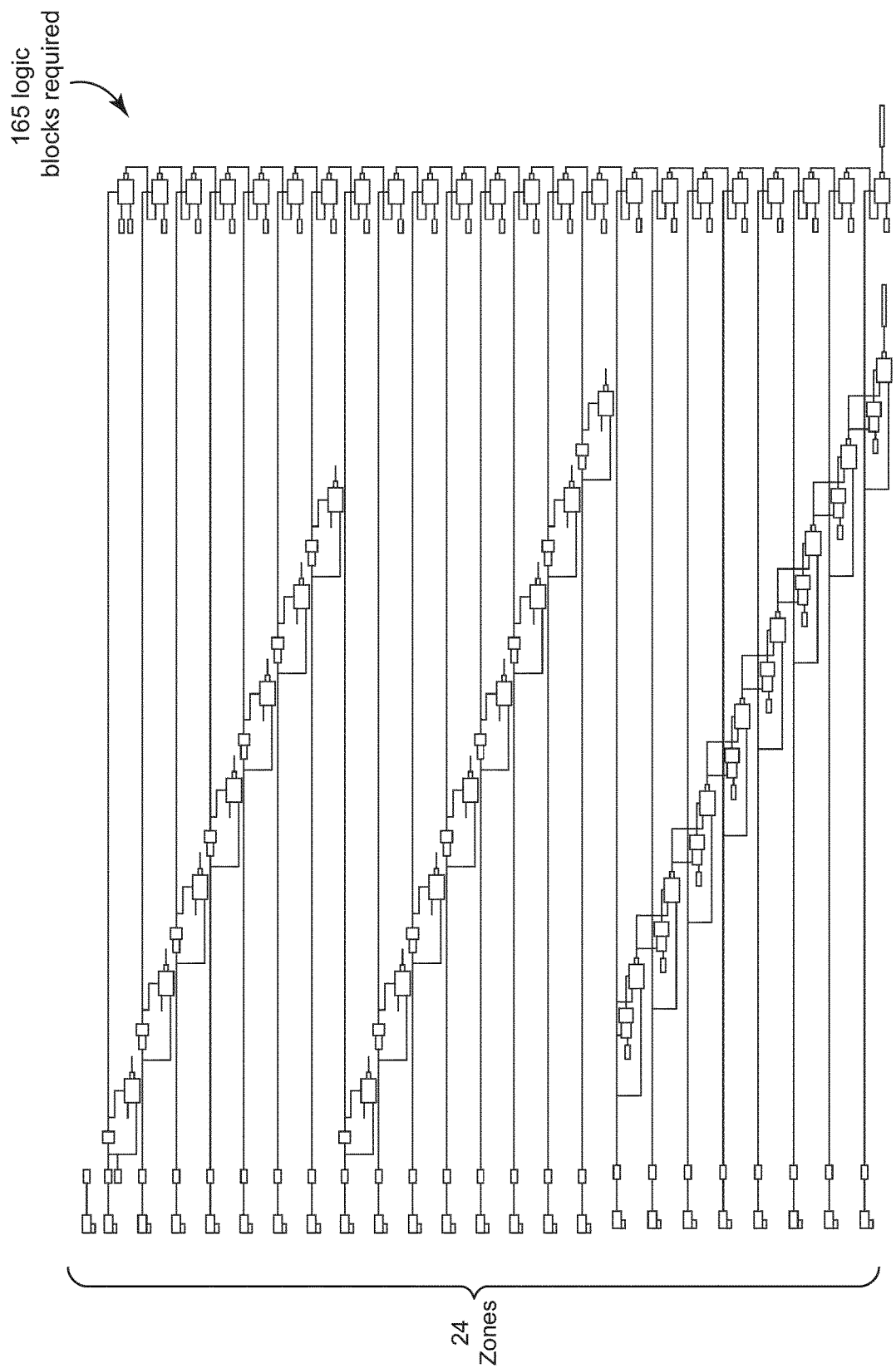
FIG. 10A is a diagram illustrating an application that does not use lists as inputs, according to an exemplary embodiment.

Referring now to FIG. 10A, a diagram illustrating an application that does not use lists as inputs is shown, according to an exemplary embodiment. FIG. 10A shows an application that determines which of the 24 zones has the largest error. In this example, the application requires 165 logic blocks and requires modifying the logic when it needs to handle a different number of zones. For example, each time a new zone is added to the application, additional blocks need to be created. As can be seen, generating such an application is time consuming, costly and requires customization. In contrast, with systems and methods of the present disclosure, a list can be used as input, solving the problems as shown in FIG. 10A.

Figure 10B:
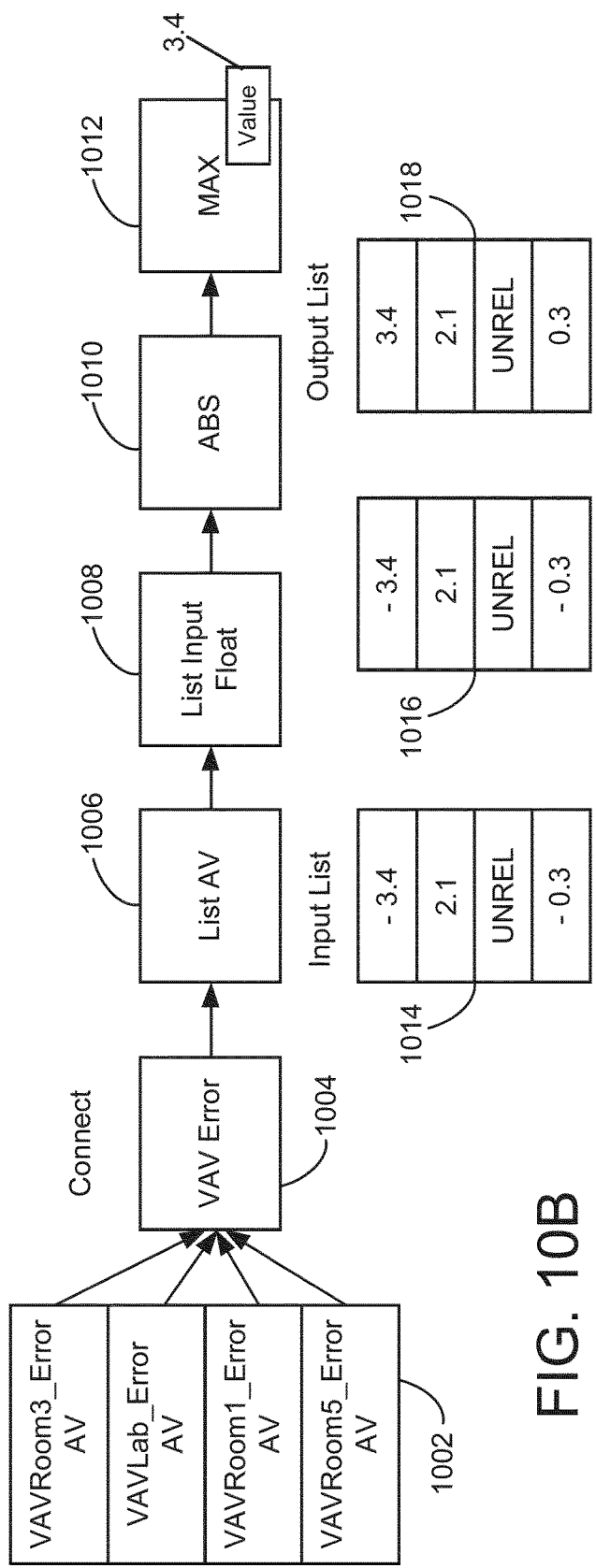
FIG. 10B is a diagram illustrating an application using lists as inputs, according to an exemplary embodiment.
Figure 10C:
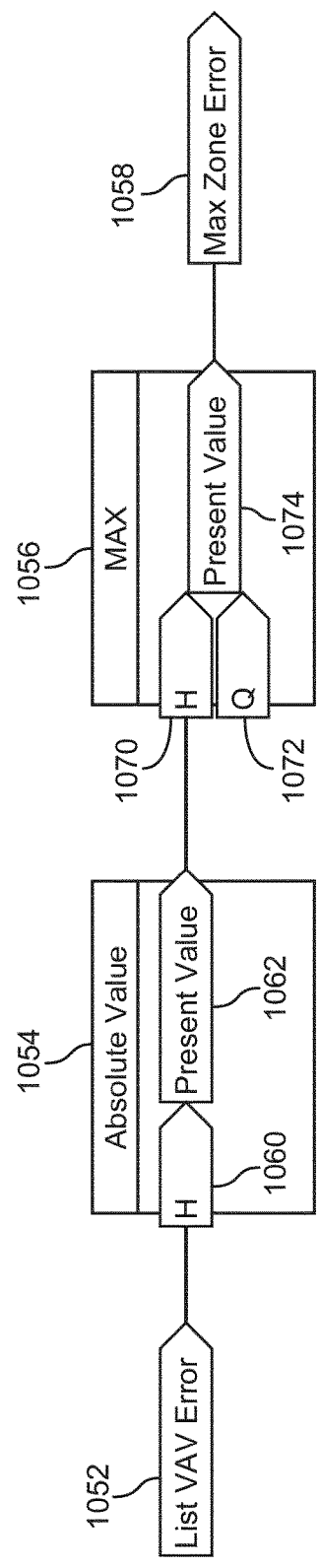
FIG. 10C is a diagram illustrating an application using lists as inputs, according to an exemplary embodiment.

Referring now to FIG. 10B, a diagram illustrating an application using lists as inputs is shown, according to an exemplary embodiment. The block diagram as shown in FIG. 10B performs the same function of that of FIG. 10A. As shown in FIG. 10B, a plurality of zone errors 1002 are connected to a List AV 1006 using a connect object (e.g., CDM connect) 1004. The input List AV has 4 analog values as shown in table 1014. The analog values are then converted to float values as shown in table 1016 and as items in List Input Float 1008. The List Input Float 1008 is taken as input to the ABS logic 1010 which outputs the absolute values as shown in table 1018. The list of absolute values are then taken as inputs to the MAX logic 1012 which outputs the maximum value (3.4) among the list of absolute values. As can be seen from FIG. 10B, using the AV List object and three other logic blocks that can act on lists, the application can be done in a few logic blocks. The lists are shown to illustrate the data that is passed, only 4 zones are shown in the lists. However, the application can handle any number of zones. The list of zones can be modified at runtime by simply connecting another value to the List AV, and the application logic does not have to be modified to handle any number of zones. FIG. 10C shows another version of using lists to perform the same function as those of FIGS. 10A and 10B. As shown in FIG. 10C, a list VAV errors 1052 is taken as input 1060 to the Absolute Value logic block 1054 which produces a list of absolute values as the output 1062. The list of absolute values is then taken as list input 1070 to the MAX logic block 1056 along with a single input value 1072. The MAX logic block 1056 uses the list input 1070 and individual input 1072 to produce an output 1074 which is the Max Zone Error 1058. Thus, similar to FIG. 10B, the application can be done in a few logic blocks and the application logic does not have to be modified when the number of zones are changed. It should be understood that the examples as shown in FIGS. 10A, 10B and 10C are for illustrative purposes only and should not be regarded as limiting.

Figure 11A:
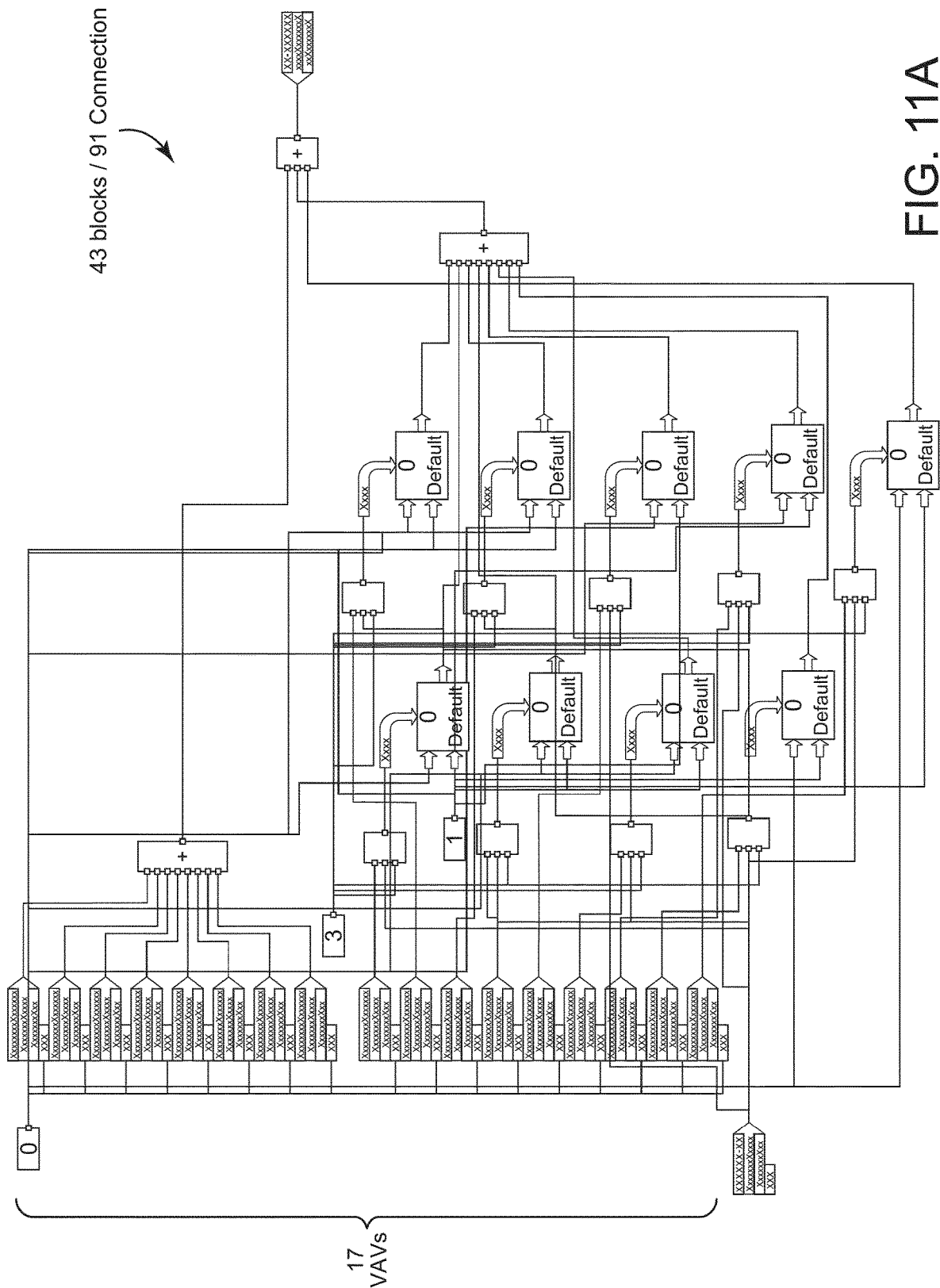
FIG. 11A is a diagram illustrating an application that does not use lists as inputs, according to an exemplary embodiment.
Figure 11B:
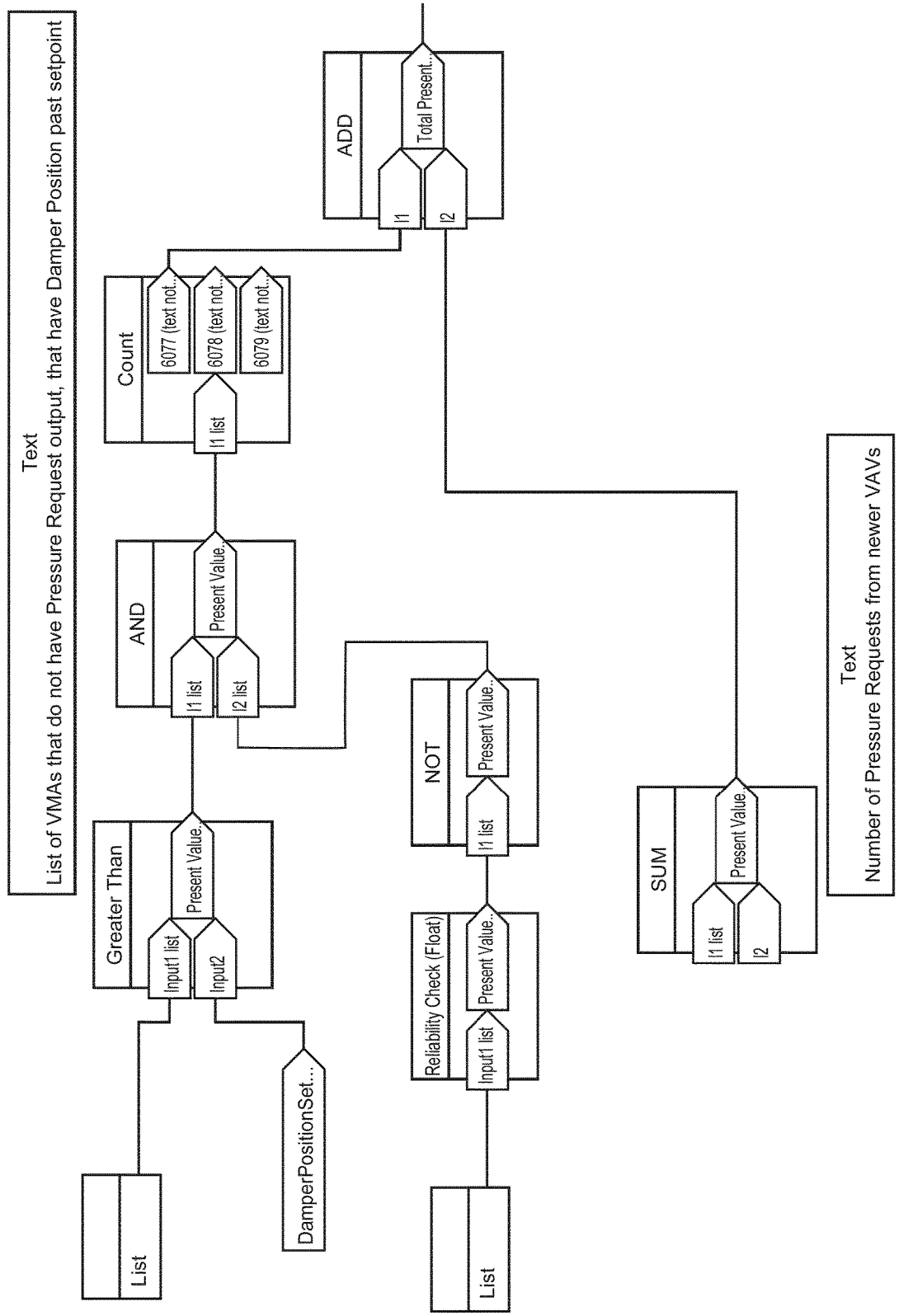
FIG. 11B is a diagram illustrating an application using lists as inputs, according to an exemplary embodiment.

FIGS. 11A and 11B illustrate examples that show similar comparison as those between FIG. 10A and FIGS. 10B/10C. FIG. 11A shows an application for pressure reset mode determination that does not use lists as input, while FIG. 11B shows the same application that uses lists as input. As shown in FIG. 11A, the application for pressure reset mode determination with 17 VAVs requires 43 blocks and 91 connections. The application has to be modified when adding new zones or based on the type of VMAs. On the other hand, by using lists as inputs, the same pressure reset mode determination application in FIG. 11B can be done in a few logic blocks and the application logic does not have to be modified when adding new zones. The application logic can also handle new VMAs and older/third party VMAs without modifications. It should be understood that the examples as shown in FIGS. 11A and 11B are for illustrative purposes only and should not be regarded as limiting.

Example Design and Objects

Figure 12:
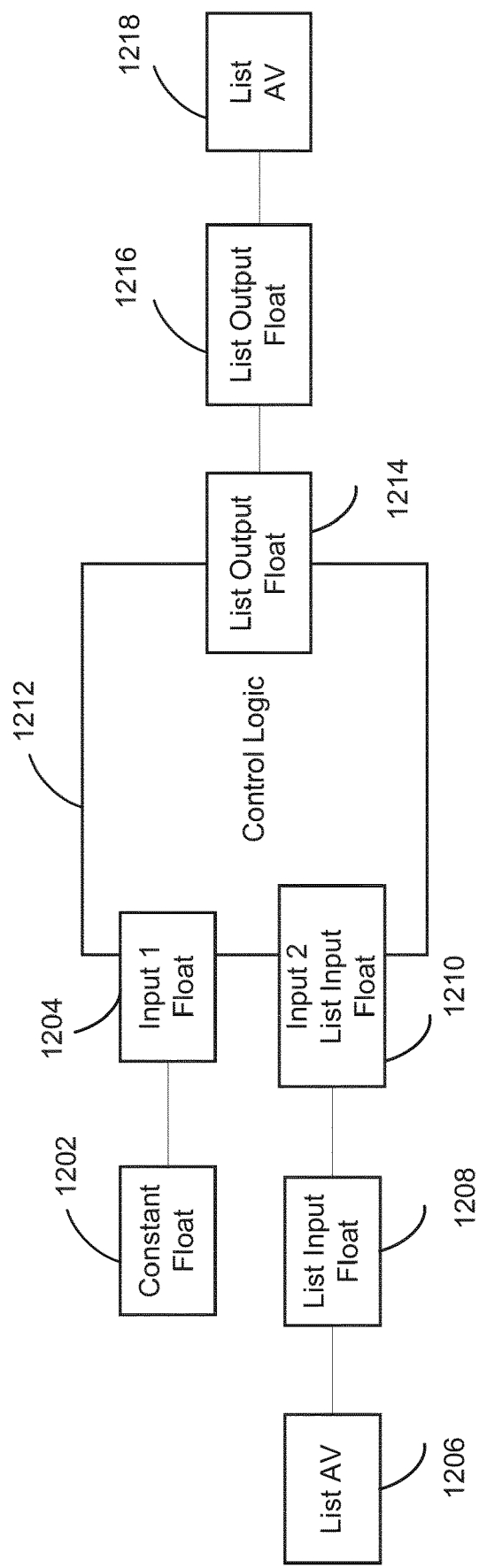
FIG. 12 is a block diagram illustrating an example high level design of adding list capability to control applications, according to an exemplary embodiment.

The following section illustrates some example design and objects used for implementing the systems and methods of the present disclosure. It should be understood that these example design and objects are for illustrative purposes only and should not be regarded as limiting. As described herein above, FIGS. 7A-7B illustrate creating lists for use in applications, in some embodiments. FIG. 12 illustrates adding list capability to control applications, in some embodiments.

Referring now to FIG. 12, a block diagram illustrating an example high level design of adding list capability to control applications is shown, according to an exemplary embodiment. As shown in FIG. 12, the control logic 1212 takes an individual input 1204 (input 1) and a list input 1210 (input 2). The first input 1204 can be a constant float value 1202. The second input 1210 which is a list input can be a list of float values 1208. The list of float values 1208 can be converted from a list of analog values 1206. The control logic 1212 has a list output 1214 which can be a list of float values 1216. The list of float values 1216 can be converted into a list of analog values 1218 to control other devices.

In some embodiments, to implement systems and methods as described herein, new blocks or objects are to be added. For example, two categories of blocks can be added or modified. The first category can include blocks used to bring the list of values into the application and pass the list from one primitive or object to another. The second category can include a set of primitives or objects that are to be changed to support an option of a list of values on one or more inputs, as well as passing a list out of the primitive or object.

In some embodiments, the following new blocks or objects can be added to accomplish the list operations. In some embodiments, an Equipment List object can be added. The Equipment List object can hold a list of references to equipment (e.g., all the VMAs associated with an error handler). In some embodiments, the list of references can be automatically populated or manually populated based on the relationships defined for the site.

In some embodiments, a new Connect object (e.g., CDM Connect object) can be added. The Connect object can be configured with a list of attribute references that it can obtain values from to create an output list. In some embodiments, the Connect object can be designed to handle a single value for connecting to an object (e.g., an AV (analog value)) or a list of references used in the list operations. The Connect object can also have a reference to a list of equipment from which the particular values needed can be obtained.

The Connect object class (e.g., CDM Connect object class) can provide the "wiring" of the Input and Output Lists in an application to the sources or destinations of the data. In some embodiments, the Connect Input object (e.g., CDM Connect Input) can be configured with a list of attribute references to the sources of the data to create the list of values as well as reliability, out of service and overridden statuses. When any of the inputs change, the Connect Input (e.g., CDM Connect Input) can create an array of structures containing the following information for each element in the array: (1) Value and Datatype, (2) Reliability, (3) Overridden, (4) Out of Service, and (5) Attribute Reference that the information for this element came from. In some embodiments, the Connect Output object (e.g., CDM Connect Output) can be used to connect a list output of an application to a list of destination attribute references. In some embodiments, normally the input list(s) and output list can be derived from the same equipment list so that corresponding values in each list are from the same equipment. In some embodiments, the Connect Output (e.g., CDM Connect Output) can be configured with a list of attribute references that it can push values to when it receives a new update from the output list of the application.

In some embodiments, three new classes of List objects (List AV, List BV and List MV) can be added to accept a list of values from the new Connect object. These objects can provide manipulations of the values such as unit conversion and adding information for user interface display of the data. In some embodiments, the list objects can also store search criteria that can be used to automatically determine what inputs to connect to.

In some embodiments, the new List objects can be created to accept a list of values from the Connect object, similar to their single value counterparts (CEC_AV, CEC_BV, CEC_MV). In some embodiments, these objects may depend on the class to provide a mechanism for the user to view and interact with the values and possibly perform optional unit conversion. They then pass the list of values into the application Input List object. Each element in the output list can include the value and its suitability. The suitability can be a new Enum with the values [Suitable, Unreliable, Out of Service, Overridden]. In some embodiments, since the List versions are not standard BACnet, they can be simpler in that they do not need to provide any of the standard BACnet behavior. These objects can perform some of the same functions as the singe value versions. For example, the List AV can support unit conversion from BAS units to the internal units of the application.

Figure 13:
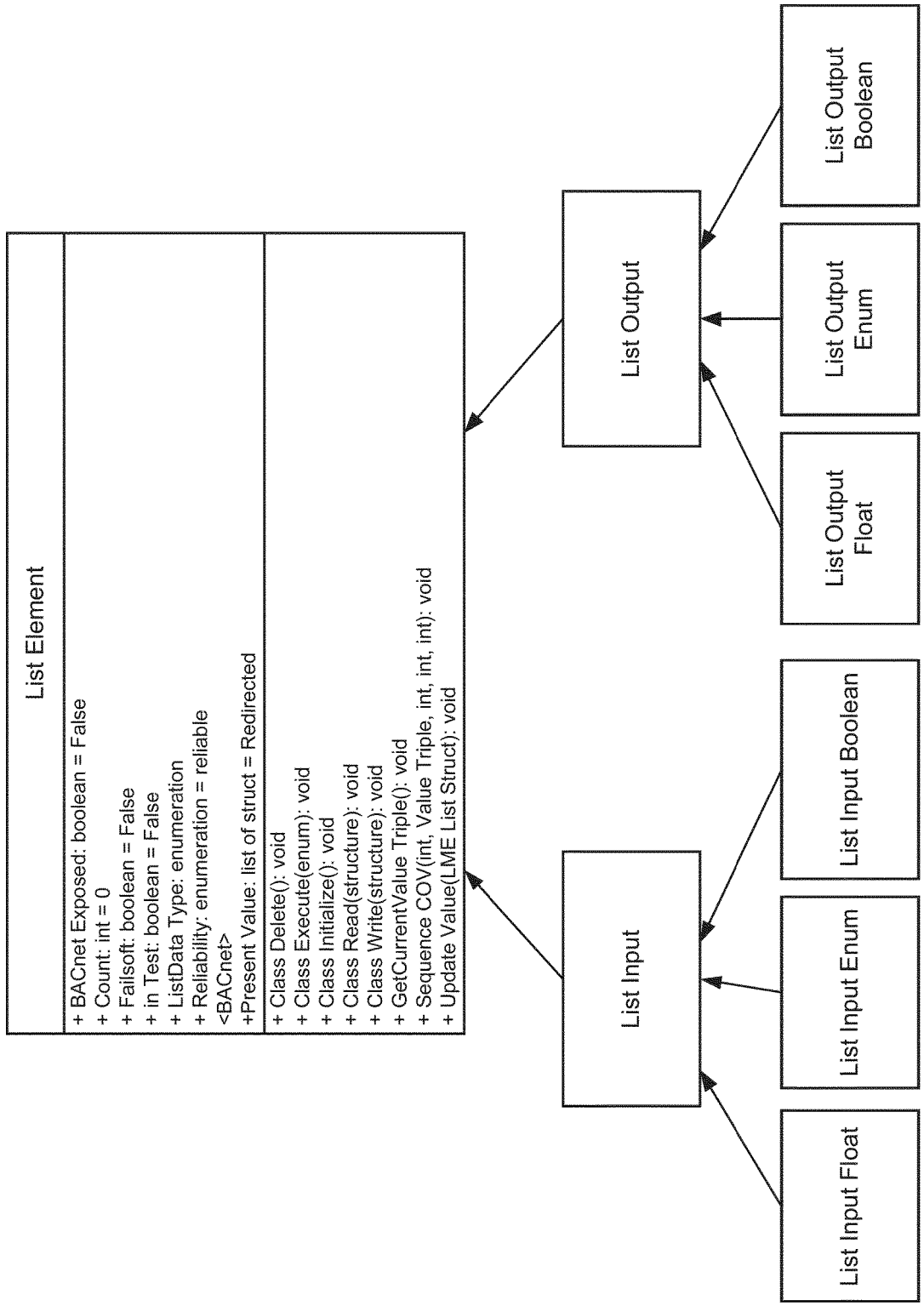
FIG. 13 shows an example design of the List Element, according to an exemplary embodiment.

In some embodiments, a new List Element and associated subclasses can be added to bring a list of data into the application as well as passing lists of data into and out of primitives that support lists. In some embodiments, to allow lists of values to be passed into the application, classes to handle list inputs and outputs for Float, Enum or Boolean values are needed. In some embodiments, the List Element object may not have much functionality, but is needed to bring the data into the application and cause the internally connected logic blocks to run when the list changes. Likewise, the output version of the list elements can receive an updated list and make it available to be utilized by connected blocks and output of the application. FIG. 13 shows an example design of the List Element.

In some embodiments, the List Element can be implemented as a hidden element block that can accept a push of a list of structures that contain the value, datatype, and suitability of each input in the list. In some embodiments, the List Element block can hold the list of values and present the information to other blocks. In some embodiments, the structure can contain the value and suitability for each element in the list. In some embodiments, the blocks may have no BACnet functionality as they are not be exposed as BACnet standard objects. The blocks can also have an output as to the total size of the list and number of suitable values.

In some embodiments, a number of primitive logic blocks (e.g., compare blocks, math blocks, statistical blocks, Boolean blocks) can be modified to accept a list of values on their inputs in addition to the primitive values currently accepted. Some of these blocks that accept a list can produce a list and some can produce a single value. The design described herein assumes that a list of values also includes the suitability of each value in the list. A value is NOT suitable if it is unreliable, overridden or out of service.

The compare blocks can be modified to accept a list of values. The compare block can accept 2 inputs, Input_1 and Input_2, and produce a Boolean output. In some embodiments, the compare block can also support a differential to use as part of the compare which would continue to work the same, just apply to each compare. The datatype of each input must be the same, and must correspond with the type of compare. The new behavior is Input_1 and/or Input_2 can now be a list of values or a single value. If both inputs are lists, the size of each list must be the same. The output of the compare block is a list if either input is a list. The behavior of the compare block can be as follows. If only one of the inputs is a list, the compare block compares each suitable element in the list against the single value of the other input, and produces a Boolean list of the results of each compare. Non-suitable elements generate a corresponding non-suitable value in the output list. If both inputs are lists, the compare block compares an element of the first list against an element in the same element position in the second list, and produces a Boolean list of the results of each compare. If either element in a compare operation is non-suitable, the result is non-suitable.

Figure 14A:
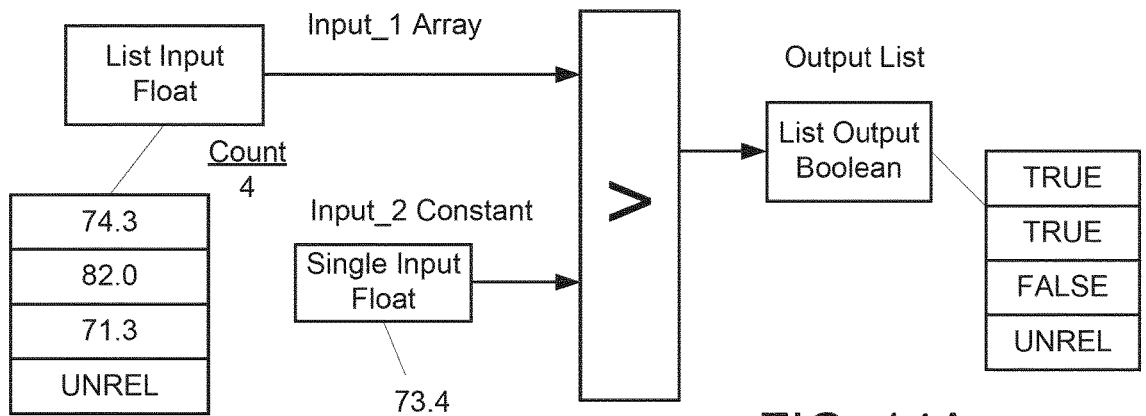
FIG. 14A illustrates an example of a compare operation having a list as input, according to an exemplary embodiment.

In some embodiments, the type of compare operations supported by the application includes (1) Float Inputs: Greater Than or Equal; Greater Than; Less Than or Equal; Less Than. (2) Float, Enum or Boolean Inputs: Equal; Not Equal. FIG. 14A illustrates an example of a compare operation having a list as input. The logic in FIG. 14A is to determine which zone in a list zones having a temperature that is greater than 73.4. As can be seen from FIG. 14A, input 1 is a list of floats, input 2 is a single float value, and the output is a list of Boolean. However, if an element is unreliable (item 4 in the input list), the corresponding output element is also unreliable (item 4 in the output list).

The math blocks can be modified to accept a list of values. The math blocks can accept 1 to N inputs depending on the specific function of the math block. In some embodiments, the math block can be modified to accept a list of floats on one or more of the inputs depending on the number of inputs defined. If any of the inputs is a list, the output of the math block is a list of the same size. If more than one input is a list, they must be the same size.

Figure 14B:
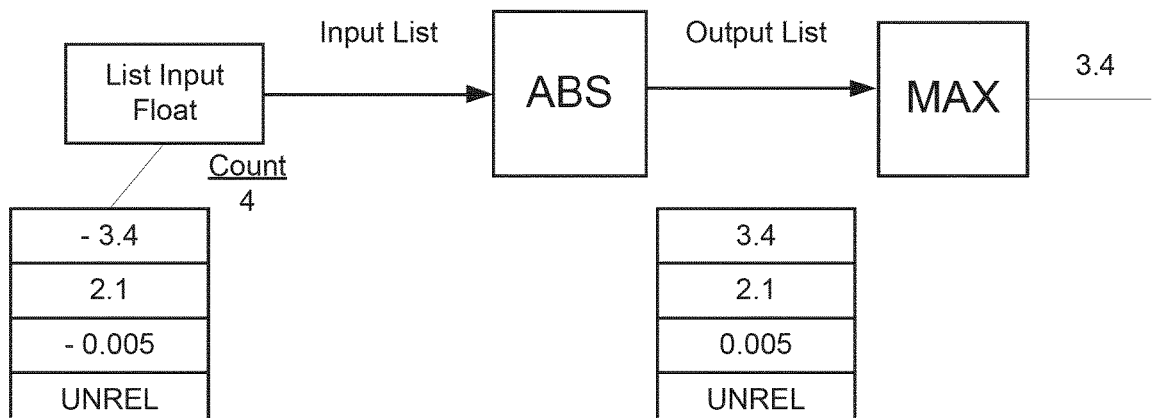
FIG. 14B illustrates an example of an ABSOLUTE operation and a MAX operation having a list as input, according to an exemplary embodiment.

The math blocks can include ABSOLUTE, COS, ACOS, SIN, ASIN, TAN, ATAN, EXP, LOG, LOG10, NEGATE, SQRT, and ROUND blocks that take a single input. These blocks can be modified to accept a list of floats as input. The specified operation is performed on each element in the list and the results are captured in an output list. Any non-suitable inputs in the list generates an non-suitable value in the output list. FIG. 14B illustrates an example of an ABSOLUTE operation and a MAX operation having a list as input. The logic in FIG. 14B is to get the maximum value of absolute values of the errors from all zones. As can be seen from FIG. 14B, the input is a list of floats and output of ABSOLUTE operation is also a list of floats which then becomes the input to the MAX operation. The MAX operation outputs a single float as the maximum number. As shown in FIG. 14B, if an element is unreliable (item 4 in the input list of the ABSOLUTE operation), the corresponding output element is also unreliable (item 4 in the output list of the ABSOLUTE operation).

The math blocks can include DIVIDE, POWER, and SUBTRACT blocks that take 2 inputs. These blocks can be modified to accept a list of floats as input on either or both inputs. If both inputs are lists, each element in the first list can be acted on by the corresponding element in the second list. If one of the inputs is a single value, the single value can be used for the operation with respect to each element in the input list which is another input. The results produce a list of the same size as that of the input list.

Figure 14C:
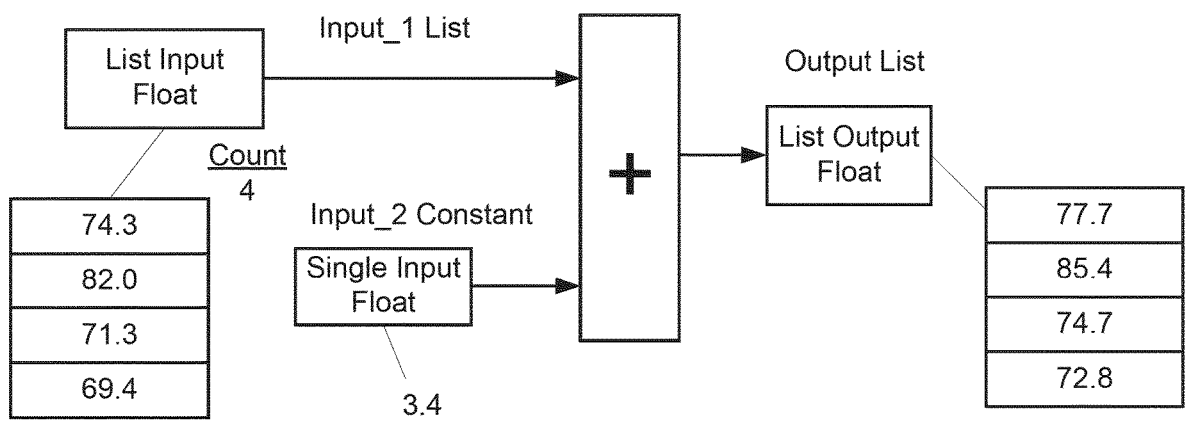
FIG. 14C illustrates an example of an ADD operation having a list as input, according to an exemplary embodiment.

The math blocks can include ADD and MULTIPLY blocks that take N inputs. These blocks can be modified to accept a list of floats as input on any of the inputs. The ADD and MULTIPLY blocks work similarly to the DIVIDE block except that more than 2 inputs are allowed. The results produce a list of the same size as any of the input lists. If at least 2 inputs are list inputs, the corresponding input in each list can be acted on by the corresponding list on the other input. A non-list value can operate on each element in a list. FIG. 14C illustrates an example of an ADD operation having a list as input. The logic in FIG. 14C is to add a constant value to all elements in a list. As can be seen from FIG. 14C, input 1 is a list of floats, input 2 is a single float value, and the output is a list of floats.

The statistical blocks can be modified to accept a list of values. The statistical blocks can accept 2 to N inputs, and can be modified to accept a list of floats or Booleans as an input and can support a single input. The output of a statistical block is always a single value. For certain blocks such as MAXIMUM or MINIMUM, the index of the entry in the input list that these values represent can also be an output. The AVERAGE, MAXIMUM, MINIMUM, MEAN, STANDARD DEVIATION blocks take N inputs and can be modified to accept a list of floats on any of the inputs. The output is a single float. All of the values of the different inputs can be operated on based on the function that the block is configured to perform. The SUM block is a new block and can accept a list of floats on any of its inputs. The SUM block can also take one input if it is a list. The Sum block totalizes the values of every suitable element from any of its inputs including those that are lists. The output is a single value of type float. When the SUM operation is with a list of float as a single input, the output is a single float which is a sum of all the suitable floats in the input list.

The Boolean blocks (e.g., NOT, AND, OR, XOR) can be modified to accept a list of values. The NOT block can take a list of Booleans as input, and outputs a same size list of Booleans with each value the NOT of the corresponding input. Values in the list that are non-suitable are in the output list as unchanged (i.e., still non-suitable). The AND, OR, and XOR blocks take N inputs and can be modified to accept a list of Booleans on any of the inputs. The AND, OR, and XOR blocks can work similarly to the Multiply and Add blocks. If any of the input is a list, the output is a list of the same size as the input list. All inputs that are lists must be the same size.

The REL CHECK block takes a single input and can be modified to accept a list of values. If the input is a list, the output is a list of the same size. The block checks the suitability of each input and outputs a TRUE for the input if it is suitable, or FALSE if it is non-suitable.

The BOOLEAN SELECTOR block is a new block and can accept N inputs. The BOOLEAN SELECTOR block can accept a list of Booleans on any of the inputs. Each item in the list of Booleans may be a binary value (e.g., true or false, yes or no, 1 or 0, etc.), an enumerated value selected from a set of possible values, or any other type of input. The items in the list of Booleans may be generated by other blocks (e.g., by performing Boolean logic on an input point) or received as an input point from an external system or device. For example, if the list of Booleans contains four items, the list may appear as [TRUE, TRUE, FALSE, TRUE]. The BOOLEAN SELECTOR block can process the list of Booleans and produce an output indicating the number of Booleans that have a particular value. For example, the BOOLEAN SELECTOR block can output the number of Booleans in the list that have a value of TRUE or the number of Booleans in the list that have a value of FALSE, depending on the configuration of the BOOLEAN SELECTOR block. If the list [TRUE, TRUE, FALSE, TRUE] is provided as an input, the BOOLEAN SELECTOR block may output a value of "3" if configured to count the number of TRUE inputs in the list of Booleans or a value of "1" if configured to count the number of FALSE inputs in the list of Booleans.

The BOOLEAN TO FLOAT block is a new block and can take 1 input that can be a single Boolean or a list of Booleans. The BOOLEAN TO FLOAT block produces either a single float or a list of floats where the Boolean 0 produces a 0.0 float, and the Boolean 1 produces a 1.0 float.

Figure 15A:
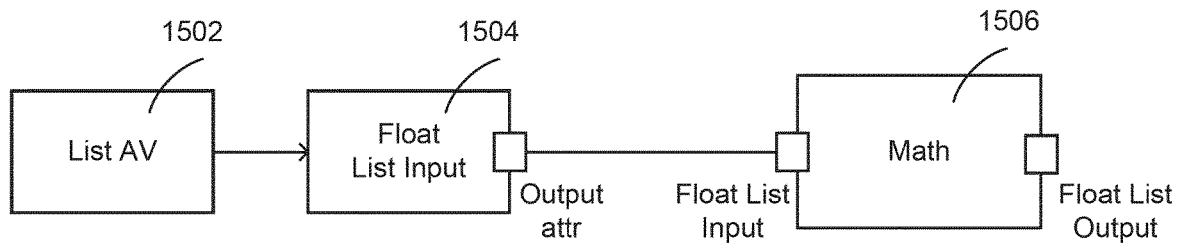
FIG. 15A illustrates an example scenario of passing list of data between blocks, according to an exemplary embodiment.

Referring to FIG. 15A, an example scenario of passing list of data between blocks is shown, according to an exemplary embodiment. Referring to FIG. 15A, list of data can be passed from a List AV 1502 to a List Input 1504, and then to a math block or primitive 1506, and then to the output of the math block 1506. In some embodiments, a single class List Element can handle both the List Input to the application as well as the Input and Output blocks that are part of the math primitive. In some embodiments, values from the List AV can be passed and stored in the input element to the math block, and then the math block can be flagged to run. Next, the math block is executed, and the data is stored to the output element associated with the math block, and all blocks connected to the output of the math block can be flagged.

Figure 15B:
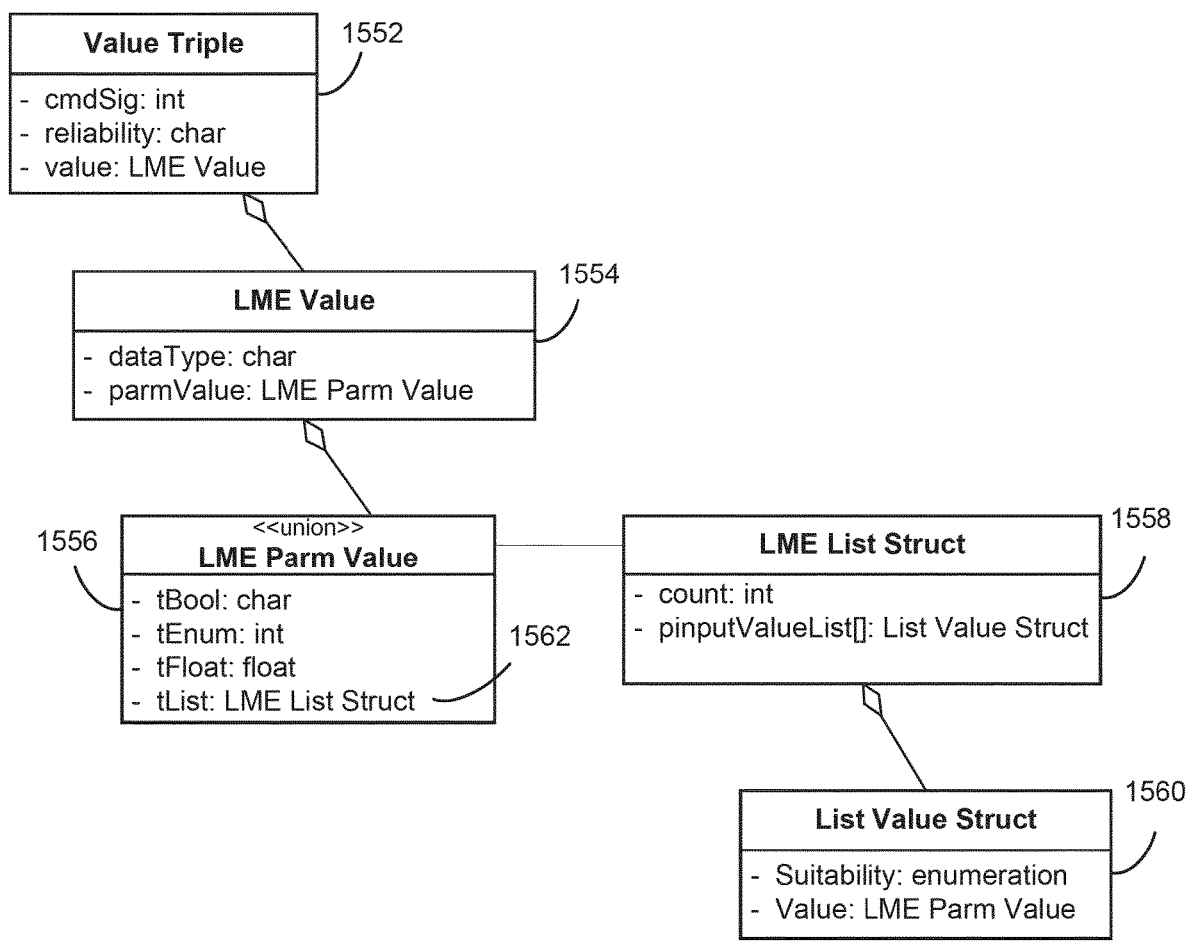
FIG. 15B illustrates data structure for use to pass list of data between blocks, according to an exemplary embodiment.

Referring to FIG. 15B, data structure for use to pass list of data between blocks is shown, according to an exemplary embodiment. In some embodiments, a value is typically passed in structure Value Triple 1552. In some embodiments, to pass lists of data between blocks, a new tList 1562 can be added to the LME Parm Value 1556. The tList 1562 can be a structure that holds the size of a list as well as pointer to the block of memory which is an array of List Value Struct 1558. In some embodiments, the general flow to pass the value from one element to another can be to pass a pointer to the memory held by the source of the value. The destination can be responsible for copying the memory into its own block of memory if the size is the same or acquiring a new block of memory of the new size and copying into it if the size is different. Because it is not expected that the size of the lists changes very often, the amount of acquiring and releasing of memory blocks can be minimized with this approach.

Example Use Cases

The following section illustrates some example use cases with the use of the configuration tool 502 to create applications that can automatically interacting with a flexible number of devices. It should be understood that these example use cases are for illustrative purposes only and should not be regarded as limiting. In the following descriptions, "equipment block" represents one or more equipment in the building configuration, "space block" represents one or more spaces in the building configuration, and "point block" represents one or more point values to get from equipment and space. The "logic editor" referenced below can be the logic editor discussed in relation to FIGS. 8A-8F. The actor of the use cases can be a user of the logic editor, such as a service technician.

Use Case 1

In this use case, a user is trying to create a simple zone temperature averaging application. This application takes four zone temperatures and averages them into one output. The precondition for this use case is: points that need to be averaged already exist. The use case starts with the launch of the logic editor. First, the user creates four "point" blocks by doing one of the following: (1) the user looks for the source points under the "all items tree" in the logic editor and drags it to the editor's canvas. This creates a "point block" representing the dragged point; OR (2) the user drags a point block from logic editor's palette to the main canvas. The user double clicks on point block, a pop-up window opens where the user can choose the point from a tree; OR (3) the user drags point block from editor's palette to the main canvas. The user can drag the point from "all items tree" on to the point block; OR (4) The user opens global search. The user inputs search criterion, and from the result list, drags desired points individually to the canvas. This results into four "point blocks" on the canvas.

Next, the user drags an average block from palette to canvas and connects all input references as inputs to the block. The user then drags an output block to the canvas, and connects the output of average block to output block. Once the user saves the logic, a system application object can appear under the engine in 'Programming' folder "all items tree"; and there can be input and output "CIO" objects under the application object.

Use Case 2

In this use case, the user is trying to create the same application in use case 1. However, this time the user leverages CDM information to help find the right input points and put CDM context to the output of the application. As discussed herein above in this disclosure, CDM information can be made available with the use the CDM database, in some embodiments. CDM ontology can help users bind applications with less work. With CDM information, system can suggest target points/systems in the current building configuration against which the application can work. In the present use case here, this extra step of adding CDM context information to the output can help other applications and systems to easily find and use output from this application. The preconditions for this use case are: (1) points that need to be averaged already exist; and (2) points have their model classes associated with them. The use case starts with the launch of the logic editor. First, the user creates four "point" blocks the same way as that in use case 1. Here, in addition to all the ways of creating point blocks mentioned in use case 1, the user can also drag a point block from the palette to canvas, click on it to bring up details. The user can type search terms (CDM terms or point name, fqr etc.) and a list of matching points can show up as search result. The user can select point(s) from search result to be associated with the point block.

Next, the user drags an average block from the palette to canvas and connects all point blocks as inputs to the block (same as in use case 1). The user drags an output block to the canvas (same as in use case 1). To easily utilize the output of this application in other applications, it may be beneficial to associate a CDM model class for the output point so that the output point can be saved in configuration data of the building and is easier to search and use in other applications. To do that the user will be provided with a pop-up window as soon as the output block is dropped on the canvas. In that window, the user is asked to search for the right point type CDM model class to describe the output. In this particular case, the user wants to associate "average zone temperature" model class to the output, since the output is a logical zone temperature.

The following describes how the search can be performed. In the pop-up window, the user can type free text describing what they are looking for. A search result section can show list of model classes with a short description. This list can be dynamically updated as the user keeps typing the search text. The user at any time can select one model class from the list. If the user does not search/select any model class, a default "point" model class can be associated to the output block.

The user connects the output from the average block to the output. Once the user saves the logic, an application object can appear under the engine in "all items tree", there can be input and output "CIO" objects under the application object, and the building configuration data can be updated. It can now have a new point instance represented by output CIO object (with model class "average zone temperature"). Later, when a user is creating some other applications and trying to search for "average zone temperature" for its input, the output point from current application can show up in the search result.

Use Case 3

In this use case, the user wants to share the zone temperature averaging application created in the previous use case with other users. The CDM context information are used in this scenario to allow sharing this application with various users across different sites/archives. The precondition for this use case is: the user has created an application as specified in use case 2. When the user created point blocks for the application mentioned in use case 2 and associated each to a point, the logic editor also captured the model class of the point and saved that information in the application. This information can be useful when this application is applied with some other site data. This information can help narrow down points that can be associated to the point block (see use case 4 below).

After the user indicates a desire to export the application, the user is given the option to enter some description about the application. A file is then downloaded to user's computer. This file can now be shared with others. The user can email the file to other users, share it on global shared library (provided they have the appropriate access to global shared library), or send it by any other means. When the user "exports" an application, all specific data about the site (point references) are removed from the exported file, and only the CDM context information remains.

Use Case 4

In this use case, the user has gotten an application file from somewhere (e.g., global shared library, via email, or any other means) and is now trying to import it into the site. The CDM context information in the application file can be utilized here to help apply the application to the building. In this use case, the application described in use case 3 is used as the import file for this use case. The precondition for this use case is: the user has gotten an application file for the application created in use case 3.

The user indicates a desire to import the application, this launches an import file dialog. The user selects the application file. The system ensures that it is an application file. System displays basic information, such as application name, description, author, etc. to the user. Based on the model class information, the system can also display a list of applicable points for each point block by searching the building configuration data. The user can select one from the result list or perform a new search. The user can also leave point blocks blank and just continue.

The user clicks the continue button, and the application opens in the logic editor's canvas. Each point block gets a visual indication depicting whether it is configured/connected properly (during the import step). The user can click on point blocks that need attention, select one point from the (already populated) search result or perform a new search with different keywords. Once the user selects a point for the input reference, the user interface can indicate that the input reference is bound. Once all input references are bound, the user can save the application. On save, the same set of actions and events occur as mentioned in use case 2.

Use Case 5

In use case 1, a simple application that takes four zone temperature inputs and averages them was created. This is probably for calculating an average zone temperature for a particular space. However, such an approach does not promote reusability, since the number of inputs is fixed to four. For example, what if a space has 5 zone temperatures, and what if a space has only 2 zone temperatures? In such cases the user needs to adjust the number of input references according to the specific space they are averaging. On the other hand, with the new "list" capability of the present disclosure, the same logic can be created in a more reusable way. Instead of having to define specific number of inputs, one input of list type can be defined.

The precondition for this use case is: points that need to be averaged already exist. The use case starts with the launch of the logic editor. First, the user creates a "point list" by doing one of the following: (1) the user looks for the source points under the "all items tree", multi-selects many points, and drags them together to the logic editor's canvas. This creates one "point block" having all the point references. Here, if the multi-selected points are of different types (e.g., one is Analog Value and other is Boolean value), the user cannot create the list and can get an error. OR (2) the user drags a point block from the logic editor's palette to the main canvas. The user double clicks on the point block, and a pop-up window opens where the user can choose multiple points from a tree. Again, if the selected points are not homogenous in term of data type, the user is not allowed to add them. OR (3) the user drags a point block from the logic editor's palette to the main canvas. The user can drag points from "all items tree" on to the point block, and this can append the dragged point to the list. The first point dragged on to the list defines its type. For example, if the first point dragged is AV with class data representing a float, and a subsequent point of BV is dragged with class data representing an integer, the user can get an error and the BV point cannot be added to the list. OR (4) the user opens global search. The user input search criterion, and from the result list, selects the desired four points and drags them together. This results into a point block on the canvas, provided all points are homogenous in term of data type.

Next, the user drags an average block from palette to canvas and connects all input references as inputs to the block. The user drags an output block to the canvas, and connects the output of average block to output block. Once the user saves the logic, an application object can appear under the engine in "all items tree", and there can be one input (representing point list) and one output (representing output block) "CIO" object under the application object.

In some embodiments, although the system does not allow list of non-homogeneous point types, it is not stop a user from creating a list of points having different model classes. For example, in a list with 5 AV points, it is acceptable if 2 have model class "zone temperature" and the rest has model class "Discharge air temperature." The user may get a warning indicating that the list appears to be unstructured, but will not be stopped from creating such a list.

The user can export this application to share it with other users. Regarding sharing application, at the time of exporting an application which has a list of points, all the distinct model classes associated to the points in the list are saved in the application. Furthermore, at the time of importing an application which has a list, all the model classes associated with that list can be used in search criterion to pre-fetch a list of suggested points that the user should pick from.

Use Case 6

The application created in use case 5 is more reusable than its previous ones. However, the user still has to figure out what specific points represent zone temperature for a space. For example, when the user is applying this logic to "room 1" which has three "zone temperature" points, user has to drag those three specific points to the input list. When the user wants to apply the same logic to "room 2" which has two "zone temperature" points, the user has to drag those two points to the input list. On the other hand, this information is already in building configuration data. Therefore, if the user, at the time of the application creation, can express the intent of averaging all zone temperatures of a specific space and not just any random "zone temperatures," the system can "assist" and "auto pick" the right points when the user is applying the logic to various spaces.

The preconditions for this use case are: (1) points that need to be averaged, already exist; (2) Points have their model classes associated with them, and relationships between point, equipment and spaces have been established. In this use case, the system provides "space" and "equipment" in addition to the already discussed "point" palette item in the logic editor. Here, the "space" and "equipment" blocks represent a generic space and equipment, respectively. Next, how these blocks can help the user to provide CDM context for the application will be described.

The use case starts with the launch of the logic editor. The user drags a "space" block to canvas. The user is presented with a pop up window with all the spaces in the building. The user can free text search to pick a specific space. The user drags a "point" block to canvas. The user connects the "space" block with "point" block. This triggers a user interface pop up, where the user can search for a specific instance/list of points on that space (although points exist on equipment that are servicing the space, in some embodiments, the system allows this shortcut for users by showing all points related to the space directly under the space). At this point, the user is presented with distinct model classes associated with points in the space. The user can select a model class (which can effectively select all points of that model class) or pick up individual points (also presented to the user in the search result). The system captures the model class(es) of all points selected by user in the "point" block, and this can be used when sharing the application with other users.

The user drags an average block from palette to canvas. The user connects the output of point block to the average block. The user drags an output block to the canvas, and connects the output of the average block to the output block. Once the user saves the logic, an application object can appear under the engine in "all items tree", and there can be one input (representing "point") and one output (representing output block) "CIO" object under the application object. The flow to export this application and import it in a new site is similar to use case 4. In some embodiments, suggestions are provided to the user for a "space" block based on all spaces in the building configuration. Once the user selects a space, the suggestion for "point" block is further narrowed down based on the "space" selected and the model class(es) associated with "point" block.

Use Case 7

This use case is a more real-world scenario to illustrate the features in the previous use cases. Here, the user is trying to create a duct static pressure reset application. This use case focuses on how this application can be connected to the building, shared, and reused. This duct static pressure reset application implementation works on an AHU, fetches the AHU's "Discharge_Air_Static_Pressure_Setpoint" and fetches "Pressure_Request_Calculated_Value" on all the VAVs that the AHU feeds air. The application then does some calculations on these values and updates the "Discharge_Air_Static_Pressure_Setpoint" of the AHU. The preconditions for this case are: (1) various AHUs, VAVs and "feeds" relationships already exist in configuration data; and (2) the required points on AHUs and VAVs exist.

The use case starts with the launch of the logic editor. The user drags an "equipment" block to canvas. The user is presented with a pop up where the user can search for equipment in the building, and the user can free text search to pick a specific equipment, in this case, a specific AHU (e.g., AHU1).

The user drags a "point" block to canvas. The user connects the "equipment" (AHU1) block to the "point" block. This triggers a user interface pop up where the user can search for points on the equipment (or any sub-equipment of AHU1). The user is also allowed to select from a list of model classes (model classes used in any point associated with the equipment). The user selects the point that represents "Discharge_Air_Static_Pressure_Setpoint", and the system stores this model class behind the scene. In addition, since the user selected a single point, the output of the "point" block is a single reference as opposed to a list. However, if the user wants to specify it as a list (of one item only), the user has an option on the pop-up window to indicate that.

The user drags another "equipment" block to the canvas. The user connects the "equipment" (AHU1) block to the new "equipment" block. This triggers a user interface pop up where the user can search for equipment directly related to AHU1. The user can also select from a list of model classes (model class of any equipment associated with AHU1). The user selects all the VAVs that AHU1 feeds. The output of the "equipment" block is a list of references representing VAVs that are fed by AHU1.

The user drags another "point" block to the canvas. The user connects the "equipment" block representing list of VAV references to this new block. This triggers a user interface pop up where the user can search for points on VAVs that represent "Pressure_Request_Calculated_Value" (again either by selecting the model class or individual points). The user selects multiple points from the search result. The output of this block is a list of point references.

The user now drags various "math" blocks required for the actual calculation. The user connects various "point" blocks' (that represent single point or list of points) outputs to various "math" blocks. The user drags an output block and connects the result of various math operations to the output block. The user needs to indicate that this output block is going to write to "Discharge_Air_Static_Pressure_Setpoint" of AHU1. The user does this by going into the details section of the output, where the user can get an option to search/select any point from the building configuration. However, in particular, the user can have the option to select existing "point" blocks on the canvas (that have single point reference as their outputs). The user selects the existing "point" block representing the "Discharge_Air_Static_Pressure_Setpoint" of AHU1. The system visually indicates the fact that the output reference block is referencing the "point" block representing "Discharge_Air_Static_Pressure_Setpoint" of AHU1.

Once the user saves the logic, an application object can appear under the engine in "all items tree", there may be three CIO objects created (representing "point" block for "Discharge_Air_Static_Pressure_Setpoint" and another representing "Pressure_Request_Calculated_Value"). When the user exports this application, the system captures the CDM information for each block as described in previous user cases. The system also captures the fact that the output in this case is pointing to the "point" block for "Discharge_Air_Static_Pressure_Setpoint." Thus, during import, the user does not need to specify different points for output and input "point" block for "Discharge_Air_Static_Pressure_Setpoint."

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system comprising:
a plurality of devices configured to measure or generate a plurality of points in a building automation system;
an electronic configuration tool configured to generate a control program; and
a controller comprising an electronic processor and memory, the memory storing the control program which, when executed by the processor, causes the processor to:
identify a primary list of N devices among the plurality of devices;
automatically generate a plurality of secondary lists of points as electronic data based on the primary list of N devices, the plurality of secondary lists of points selected from the plurality of points generated by the N devices based on a determination that the plurality of secondary lists of points are inputs to a control logic, wherein each secondary list includes N points, each of the N points in each secondary list is associated with a respective device of the N devices in the primary list; and
provide the plurality of secondary lists of points as inputs to the control logic configured to use the plurality of secondary lists of points to generate one or more electronic control signals to control the N devices.

2. The system of claim 1, wherein the memory stores the control program, which when executed by the processor, further causes the processor to:
identify the plurality of points on each device by searching a database using the each device as index, wherein the database includes relationships between devices and points.

3. The system of claim 1, wherein each point measured or generated by the plurality of devices is associated with a model class including a type of temperatures, type of pressures, a type of flow rates, a type of positions, or a type of resource consumptions.

4. The system of claim 1, wherein all N points in a secondary list are of a same data type.

5. The system of claim 4, wherein the data type includes an analog data type, a Boolean data type, or a float data type.

6. The system of claim 1, wherein the N devices relate to each other based on a predetermined criteria.

7. The system of claim 1, wherein the memory stores the control program,
which when executed by the processor, further causes the processor to:
identify a second primary list of M devices among the plurality of devices, wherein M is an integer, and M does not equal to N;
automatically generate a second plurality of secondary lists of points based on the second primary list of M devices, wherein each of the second plurality of secondary lists includes M points, each of the M points is associated with a respective device of the M devices, all M points within a same second secondary list belong to a same model class, and points in different second secondary lists belong to different model classes; and provide the second plurality of secondary lists of points as inputs to the control logic configured to use the second plurality of secondary lists of points to generate one or more control signals to control the M devices.

8. A device comprising:

an electronic processor;

a memory coupled to the processor, the memory storing computer-executable instructions, which when executed by the processor, cause the processor to:
- identify a primary list of N devices of a plurality of devices configured to measure or generate a plurality of points;
- automatically generate a plurality of secondary lists of points based on the primary list of N devices, the plurality of secondary lists of points selected from the plurality of points generated by the N devices based on a determination that the plurality of secondary lists of points are inputs to a control logic, wherein each secondary list includes N points, each of the N points in each secondary list is associated with a respective device of the N devices in the primary list; and
- provide the plurality of secondary lists of points as inputs to the control logic configured to use the plurality of secondary lists of points to generate one or more control signals to control the N devices.

9. The device of claim 8, wherein the memory stores the computer-executable instructions, which when executed by the processor, further cause the processor to:
- identify the plurality of points on each device by searching a database using the each device as index, wherein the database includes relationships between devices and points.

10. The device of claim 8, wherein each point measured or generated by the plurality of devices is associated with a model class including a type of temperatures, a type of pressures, a type of flow rates, a type of positions, or a type of resource consumptions.

11. The device of claim 8, wherein all N points in a secondary list are of a same data type.

12. The device of claim 11, wherein the data type includes an analog data type, a Boolean data type, or a float data type.

13. The device of claim 8, wherein the N devices relate to each other based on a predetermined criteria.

14. The device of claim 8, wherein the memory stores the computer-executable instructions, which when executed by the processor, further cause the processor to:
- identify a second primary list of M devices among the plurality of devices, wherein M is an integer, and M does not equal to N;
- automatically generate a second plurality of secondary lists of points based on the second primary list of M devices, wherein each of the second plurality of secondary lists includes M points, each of the M points is associated with a respective device of the M devices, all M points within a same second secondary list belong to a same model class, and points in different second secondary lists belong to different model classes; and
- provide the second plurality of secondary lists of points as inputs to the control logic configured to use the second plurality of secondary lists of points to generate one or more control signals to control the M devices.

15. A method comprising:

identifying, by a computer processor, a primary list of N devices of a plurality of devices configured to measure or generate a plurality of points;

automatically generating, by the computer processor, a plurality of secondary lists of points based on the primary list of N devices, the plurality of secondary lists of points selected from the plurality of points generated by the N devices based on a determination that the plurality of secondary lists of points are inputs to a control logic, wherein each secondary list includes N points, each of the N points in each secondary list is associated with a respective device of the N devices in the primary list; and providing, by the computer processor, the plurality of secondary lists of points as inputs to the control logic configured to use the plurality of secondary lists of points to generate one or more control signals to control the N devices.

16. The method of claim 15, wherein a user interface is configured to allow searching for the list of N devices.

17. The method of claim 15, wherein each point measured or generated by the plurality of devices is associated with a model class including a type of temperatures, a type of pressures, a type of flow rates, a type of positions, or a type of resource consumptions.

* * * * *